(12) United States Patent
Wentink et al.

(10) Patent No.: US 9,191,970 B2
(45) Date of Patent: Nov. 17, 2015

(54) SYSTEM AND METHOD OF COMMUNICATION USING DISTRIBUTED CHANNEL ACCESS PARAMETERS

(71) Applicant: Qualcomm Incorporated, San Diego, CA (US)

(72) Inventors: Maarten Menzo Wentink, Breukelen (NL); Simone Merlin, San Diego, CA (US); Alfred Asterjadhi, San Diego, CA (US); Zhi Quan, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 13/672,545

(22) Filed: Nov. 8, 2012

(65) Prior Publication Data

US 2013/0176902 A1    Jul. 11, 2013

Related U.S. Application Data

(60) Provisional application No. 61/584,698, filed on Jan. 9, 2012, provisional application No. 61/585,810, filed on Jan. 12, 2012, provisional application No. 61/636,382, filed on Apr. 20, 2012, provisional application No. 61/661,326, filed on Jun. 18, 2012, provisional application No. 61/670,575, filed on Jul. 11, 2012.

(51) Int. Cl.
*H04L 12/24* (2006.01)
*H04L 12/751* (2013.01)
(Continued)

(52) U.S. Cl.
CPC .......... *H04W 74/00* (2013.02); *H04W 52/0219* (2013.01); *H04W 74/08* (2013.01); *H04W 74/0833* (2013.01); *H04W 84/18* (2013.01)

(58) Field of Classification Search
CPC ......... H04L 41/12; H04L 45/02; H04L 45/00; H04L 47/10; H04L 29/5672
USPC .......................................... 370/254, 389, 392
See application file for complete search history.

(56) References Cited

U.S. PATENT DOCUMENTS 6,813,260 B1    11/2004  Fogle
8,233,389 B2    7/2012   Yim et al.
(Continued)

FOREIGN PATENT DOCUMENTS

WO    2012141758 A1    10/2012

OTHER PUBLICATIONS

Park, et al., "TGah EDCA Parameter Set Proposal", Intel Corp, Oct. 18, 2011, pp. 1-9.
(Continued)

*Primary Examiner* — Ronald B Abelson
(74) *Attorney, Agent, or Firm* — Eric Ho

(57) ABSTRACT

A device includes a processor and a memory accessible by the processor. The memory includes access category data specifying one or more access categories. The one or more access categories include a sensor access category specifying distributed channel access parameters to be used by one or more station devices to wirelessly communicate sensor data via a network. The memory further includes instructions executable by the processor to send at least a portion of the access category data to a station device to enable the station device to communicate sensor data.

61 Claims, 11 Drawing Sheets

(51) Int. Cl.
*H04L 12/701* (2013.01)
*H04L 12/801* (2013.01)
*H04W 74/00* (2009.01)
*H04W 52/02* (2009.01)
*H04W 74/08* (2009.01)
*H04W 84/18* (2009.01)

(56) References Cited

U.S. PATENT DOCUMENTS

| | | | |
|---|---|---|---|
| 2006/0050742 | A1 | 3/2006 | Grandhi et al. |
| 2006/0221879 | A1 | 10/2006 | Nakajima et al. |
| 2006/0262737 | A1 | 11/2006 | Livet et al. |
| 2006/0291402 | A1 | 12/2006 | Yun et al. |
| 2008/0056125 | A1 | 3/2008 | Kneckt et al. |
| 2008/0056297 | A1 | 3/2008 | Gaur et al. |
| 2008/0069040 | A1 | 3/2008 | An |
| 2008/0151848 | A1 | 6/2008 | Fischer et al. |
| 2008/0240049 | A1 | 10/2008 | Gaur |
| 2009/0067326 | A1 | 3/2009 | Perrot et al. |
| 2009/0122755 | A1 | 5/2009 | Seok et al. |
| 2009/0279427 | A1 | 11/2009 | Ji et al. |
| 2010/0150116 | A1* | 6/2010 | Ji et al. ............ 370/338 |
| 2011/0032822 | A1 | 2/2011 | Soomro |
| 2011/0149795 | A1 | 6/2011 | Tanaka et al. |
| 2011/0176521 | A1* | 7/2011 | Park et al. ............ 370/336 |
| 2011/0299423 | A1* | 12/2011 | Shim et al. ............ 370/254 |
| 2012/0099497 | A1 | 4/2012 | Vaidya et al. |
| 2012/0182886 | A1 | 7/2012 | Ong et al. |
| 2013/0064236 | A1 | 3/2013 | Ji et al. |
| 2013/0279426 | A1 | 10/2013 | Wentink |
| 2013/0279427 | A1 | 10/2013 | Wentink et al. |

OTHER PUBLICATIONS

Park M., "802.11ah channel access improvement; 11-11-1230-00-00ah-802-11ah-channel-access-improvement", IEEE Draft; IEEE-SA Mentor, Piscataway, NJ, USA, vol. 802.11ah, Sep. 18, 2011, pp. 1-7, XP017673661, [retrieved on Sep. 18, 2011].

Partial International Search Report—PCT/US2013/020853—ISA/EPO—Apr. 25, 2013.

Alex A., "Alternate EDCA Parameter Set", NDS Ltd, Jan. 18, 2010, pp. 1-19, XP055074079, Retrieved from the Internet: URL: https://mentor.ieee.org/ [retrieved on Aug. 5, 2013] p. 10, line 15-line 32.

Asterjadhi A., et al., Qualcomm Inc: "Comment Resolution for EDCA Parameter Set", Jul. 1, 2013, pp. 1-4, XP055073885, INET Retrieved from the Internet: URL: https://mentor.ieee.org/ [retrieved on Aug. 1, 2013] the whole document.

Chesson G., et al., "EDCF Proposed Draft Text; 11-01-131-01-000e-vdcf-proposed-draft-text", IEEE Draft; 11-01-0131-01-OOOE-VDCF-Proposed-Draft-Text, IEEE-SA Mentor, Piscataway, NJ USA, vol. 802.11e, No. 1, Mar. 15, 2001, pp. 1-18, XP017693313, [retrieved on Mar. 15, 2001] Section 7.3.2.14; p. 2.

Dickey S.R., "Mar. 2008 Plenary Session TGp Minutes; 11-08-0386-03-000p-march-2008-plenary-session-tgp-minutes", IEEE Draft; 11-08-0386-03-000P-March-2008-Plenary-Session-TGP-Minutes, IEEE-SA Mentor, Piscataway, NJ USA, vol. 802.11p, No. 3, Mar. 24, 2008, pp. 1-16, XP017681599, [retrieved on Mar. 24, 2008] p. 9.

Dickey S.R., "TGP non-BSS Approach; 11-08-0854-00-000p-tgp-non-bss-approach" IEEE Draft; 11-08-0854-00-OOOP-TGP-Non-BSS-Approach, IEEE-SA Mentor, Piscataway, NJ USA, vol. 802.11p, Jul. 15, 2008, pp. 1-19, XP017680899, [retrieved on Jul. 15, 2008] p. 15-p. 16.

Han B., et al., "Channel Access Throttling for Improving WLAN QoS", Sensor, Mesh and Ad Hoc Communications and Networks, 2009, SECON '09, 6th Annual IEEE Communications Society Conference on, IEEE, Piscataway, NJ, USA, Jun. 22, 2009, pp. 1-9, XP031493051, ISBN: 978-1-4244-2907-3.

Han B., et al., "Channel Access Throttling for Overlapping BSS Management", Communications, 2009, ICC '09. IEEE International Conference on, IEEE Piscataway, NJ USA, Jun. 14, 2009, pp. 1-6, XP031505789, ISBN: 978-1-4244-3435-0 p. 2, right-hand column, line 49-p. 3, left-hand column, line 20.

McNew J., "No WBSS, No Beacon, comment resolution; 11-08-1024-07-000p-no-wbss-no-beacon-comment-resolution", IEEE Draft; 11-08-1024-07-000P-No-WBSS-No-Beacon-Comment-Resolution, IEEE-SA Mentor, Piscataway, NJ USA, vol. 802.11p, No. 7, Sep. 10, 2008, pp. 1-52, XP017680607, [retrieved on Sep. 10, 2008] p. 17 p. 35 pp. 38-39.

Jafarian, et al., "EDCA Parameters", IEEE 802.11-12/861r0. IEEE 802.11ah (TGah), Jul. 16, 2012, retrieved from: https://mentor.ieee.org/802.11/dcn/12/11-12-0861-00-00ah-edca-parameters-for-11ah.pptx.

Park, et al., "802.11ah Channel Access Improvement", IEEE 802.11ah (TGah), May 14, 2012, retrieved from: https://mentor.ieee.org/802.11/dcn/11/11-1230-01-00ah-802-11ah-channel-access-improvement. pptx.

Baker S. D., et al., "Medical-Grade, 47-63 Mission-Critical Wireless Networks [Designing an Enterprise Mobility Solution in the Healthcare Environment]", IEEE Engineering in Medicine and Biology Magazine, IEEE Service Center, Piscataway, NJ, US, vol. 27, No. 2, Mar. 1, 2008, pp. 86-95, XP011205624, ISSN: 0739-5175.

Benhaddou D et al., : "Remote Healthcare Monitoring System Architecture using Sensor Networks", Region 5 Conference, 2008 IEEE, IEEE, Piscataway, NJ, USA, Apr. 17, 2008, pp. 1-6, XP031285325, ISBN: 978-1-4244-2076-6.

International Search Report and Written Opinion—PCT/US2013/020853—ISA/EPO—Jun. 5, 2013.

Joseph Teo Chee Ming (Institute for Infocomm Research) et al,. "Sep. 2011 TGah meeting minutes; 11-11-1358-00-00ah-september-2GII-tgah-meeting-minutes", IEEE Draft; 11-11-1358-00-00AH-September-2011-TGah-Meeting-Minutes, IEEE-SAmentor, Piscataway, NJ USA, vol. 802.11ah, Oct. 3, 2011,. pp. 1-13, XP017673447, [Retrieved on Oct. 3, 2011].

Partial International Search Report—PCT/US2013/037200—ISA/EPO—Jun. 21, 2013.

* cited by examiner

FIG. 2A

| Access Category | CWmin | CWmax | AIFSN |
|---|---|---|---|
| Best Efforts | 31 | 1023 | 7 |
| Video | 15 | 31 | 5 |
| Voice | 15 | 31 | 4 |
| Sensor | 7 | 31 | 2 |

FIG. 2B

| Access Category | CWmin | CWmax | AIFSN | Transmission Opportunity (TXOP) | |
|---|---|---|---|---|---|
| | | | | First TXOP | Second TXOP |
| Best Efforts | 31 | 1023 | 7 | 0 | 0 |
| Video | 15 | 31 | 5 | 20 ms | 3.08 ms |
| Voice | 7 | 31 | 4 | 15.04 ms | 1.504 ms |
| Sensor | 7 | 15 | 2 | 15.6 ms | 0 |

FIG. 2C

| UP | Access Category |
|---|---|
| 1 | Background |
| 0 | Best Efforts |
| 2 | Video |
| 3 | |
| 4 | Voice |
| 5 | |
| 6 | Sensor |
| 7 | |

FIG. 2D

| UP | Access Category |
|---|---|
| 0 | Best Efforts |
| 1 | |
| 2 | Video |
| 3 | |
| 4 | Voice |
| 5 | |
| 6 | Sensor |
| 7 | |

| Element ID | Length (18) | QoS Info | Reserved | AC_BE Parameter Record | AC_BK Parameter Record | AC_VI Parameter Record | AC_VO Parameter Record |
|---|---|---|---|---|---|---|---|
| 1 | 1 | 1 | 1 | 4 | 4 | 4 | 4 |

Octets:

EDCA Parameter Set IE
(e.g., repeated each STA/STA group/STA type
(from Qos Info or Reserved field to end))

*FIG. 10*

SYSTEM AND METHOD OF COMMUNICATION USING DISTRIBUTED CHANNEL ACCESS PARAMETERS

I. CROSS-REFERENCE TO RELATED APPLICATIONS

The present application claims priority from commonly owned U.S. Provisional Patent Application No. 61/584,698 filed on Jan. 9, 2012, U.S. Provisional Patent Application No. 61/585,810 filed on Jan. 12, 2012, U.S. Provisional Patent Application No. 61/636,382 filed on Apr. 20, 2012, U.S. Provisional Patent Application No. 61/661,326 filed on Jun. 18, 2012, and U.S. Provisional Patent Application No. 61/670,575 filed on Jul. 11, 2012, the contents of each of which are expressly incorporated herein by reference in their entirety.

II. FIELD

The present disclosure is generally related to wirelessly communicating using distributed channel access parameters.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

In a wireless network, such as an Institute of Electrical and Electronics Engineers (IEEE) 802.11ah compliant network, distributed channel access parameters may be defined to control access to a transmission medium (e.g., a wireless network) by devices communicating via the wireless network.

Distributed channel access parameters may permit high priority traffic a greater chance of being sent than low priority traffic. For example, a station transmitting high priority traffic may wait for less time on average before sending a packet than another station transmitting low priority traffic. Distributed channel access parameters prioritize traffic by defining different contention windows (CW) and different arbitration inter-frame space (AIFS) values for high priority traffic and low priority traffic. For example, high priority traffic may have a shorter CW and a shorter AIFS than lower priority traffic. Levels of priority in the distributed channel access parameters may be referred to as access categories (ACs).

A quality of service (QoS) technique referred to as class of service (CoS) includes a 3-bit field called a priority code point (PCP) and may be communicated within a frame header transmitted via a network compliant with one or more IEEE standards. The PCP specifies a priority value between zero (0) (e.g., a lowest priority) and seven (7) (e.g., a highest priority) inclusive that may be used to differentiate traffic. Access categories (e.g., priority levels) may be mapped directly from Ethernet-level class of service (CoS) priority levels.

IV. SUMMARY

Systems and methods of wirelessly communicating using distributed channel access parameters are disclosed. The distributed channel access parameters described herein may be adapted for sensor traffic and sensor device activity. In particular, the described techniques may find application in Institute of Electrical and Electronics Engineers (IEEE) 802.11ah compliant devices that have low duty cycles. To illustrate, a wireless sensor that communicates over an IEEE 802.11ah compliant network may wake up for a relatively short time period to perform at least one measurement, communicate a result of the measurement to a destination, and then sleep for a comparatively long period of time. Because the wireless sensor may have a low duty cycle (i.e., a short "active state" duration), the channel access parameters associated with sensor traffic may be assigned a high priority to conserve power of energy-constrained devices (e.g., devices that operate using a battery power source).

In a particular embodiment, a sensor access category (SE) may be assigned a highest priority (e.g., a low arbitration inter-frame space number (AIFSN) value). Values of contention windows (e.g., CWmin and CWmax) of the sensor access category (SE) may also be adjusted to support a large number of station devices (e.g., sensors). For example, multiple sensors may transmit short packets having a duty cycle of less than one (1) packet per second (pkt/sec). Non-sensor access categories may be defined as well. For example, a best efforts access category (BE) may include best efforts traffic and background traffic (e.g., the best efforts traffic and the background traffic may be merged into a single access category). The best efforts traffic may include web browsing traffic and the background traffic may include data that is not user defined (e.g., application update data associated with an application of a device). As another example, distributed channel access parameters of a video access category (VI) and a voice access category (VO) may be defined such that voice traffic experiences a low access delay and video traffic is transmitted at a high bit rate.

The AIFSN value may be associated with prioritizing a particular access category over another access category (AC). The AIFSN values may define shortening or expanding of a time period that a station is to wait between transmitting successive frames. A shorter wait time period permits a message to have a higher probability of being transmitted with low latency, which is a consideration for delay-critical data, such as media data (e.g., voice data, video data, or streaming data). An arbitration inter-frame space (AIFS) value may be defined by a formula: AIFS[AC]*ST+SIFS, where AIFSN depends on the access category, ST is a slot time dependent on a physical layer, and short inter-frame space (SIFS) is a time between a DATA frame and an acknowledge (ACK) frame.

The distributed channel access parameters may correspond to contention free access to a channel for a period called a transmit opportunity (TXOP) (e.g., transmission opportunity). The TXOP is a bounded time interval during which a station may send as many frames as possible, as long as a duration of a particular transmission does not extend beyond a maximum duration of the TXOP. If the particular transmission extends beyond the maximum duration of the TXOP, the transmission may be divided into multiple transmissions that do not extend beyond the maximum duration of the TXOP. The use of TXOPs reduces a problem of low rate stations acquiring an inordinate amount of channel time that can occur in legacy IEEE 802.11 distributed coordination function (DCF) media access control (MAC) networks. A TXOP time interval of zero (0) indicates the station is limited to a single MAC service data unit (MSDU) or MAC management protocol data unit (MMPDU).

The distributed channel access parameters for non-sensor traffic may be specified to account for different quality of service (QoS) requirements associated with different types of traffic. For example, video traffic, voice traffic, best efforts traffic, and background traffic may each have different QoS requirements.

In a particular embodiment, the distributed channel access parameters may be defined for four access categories. The four access categories may include a sensor access category (SE) for sensor traffic, a voice access category (VO) for voice traffic, a video access category (VI) for video traffic, and a best efforts access category (BE) for best efforts traffic and background traffic. A hierarchy of priority of the access categories may indicate that the sensor traffic has a higher priority as compared to other traffic types. In a particular embodiment, the distributed channel access parameters may define a corresponding contention window minimum (CWmin) value, a corresponding contention window maximum (CWmax) value, and an arbitration intra-frame spacing number (AIFSN) value for each access category. In a particular embodiment, each of the CWmin value, the CWmax value, and the AIFSN value may be static values.

In another particular embodiment, a transmission opportunity (TXOP) (e.g., transmit opportunity) may be defined for multiple access categories used in an IEEE 802.11ah complaint network. For example, a TXOP value for a sensor access category (SE) may be defined as approximately (e.g., ±20%) fifteen and six tenths (15.6) milliseconds (ms) which would allow a particular sensor to send one packet (e.g., two hundred fifty-six (256) Bytes at one hundred fifty (150) kilobytes per second (kbps)). TXOP values for a voice access category (VO) and a video access category (VI) may be defined based on a scaling factor of ten (10) applied to TXOP values for the voice access category (VO) and the video access category (VI) as defined by IEEE 802.11ac. As a further example, TXOP values for a best efforts access category and a background access category may be defined as zero (0). In a particular embodiment, all TXOP values greater than twenty (20) milliseconds (ms) may be truncated to approximately (e.g., ±20%) twenty (20) milliseconds (ms) to account for at least propagation, channel, and doppler effect issues.

In another particular embodiment, transmission opportunity (TXOP) values defined for multiple access categories used in an IEEE 802.11 ah complaint network may include TXOP values as defined by IEEE 802.11 ac. In a particular embodiment, the TXOP values may include a TXOP value for a sensor access category (SE). For example, the TXOP value for the sensor access category (SE) may be zero (0).

In another embodiment, multiple access categories may be defined as follows. A highest priority access category may be specified for Voice and Sensor (VS) applications. A second highest priority access category may be defined for Video (VI). A third highest priority access category may be defined as a better than Best Effort (BBE) category. A lowest priority access category may be defined as a Best Effort (BE) Category. The resulting set of Access Categories is VS/VI/BBE/BE. As such, the following Access Category (AC) structure from highest to lowest with the same or different order and with various level(s) of priority may include: VS (Voice/Sensors), VI (Video), BBE (Better than Best Effort), BE (Best Effort). The AC structure (e.g., SE/VO/VI/BE) provided throughout in combinations may be augmented with VS/VI/BBE/BE, in accordance with various embodiments.

The distributed channel access parameters may be utilized as default parameters for use in an IEEE 802.11ah network. For example, an IEEE 802.11ah compliant access point may store the distributed channel access parameters and may communicate such parameters to wirelessly connected stations. Thereafter, data traffic is prioritized based on an access category of such traffic. For example, sensor traffic (i.e., having a sensor access category (SE)) may be transmitted at a higher priority than other types of traffic.

In a particular embodiment, a device (e.g., an access point) includes a processor and a memory accessible by the processor. The memory includes access category data specifying one or more access categories. The one or more access categories include a sensor access category specifying distributed channel access parameters to be used by one or more station devices to wirelessly communicate sensor data via a network. The memory further includes instructions executable by the processor to send at least a portion of the access category data to a station device to enable the station device to communicate sensor data.

In another particular embodiment, a device includes a processor and a memory accessible by the processor. The memory includes access category data specifying one or more access categories. The one or more access categories include a sensor access category specifying distributed channel access parameters to be used to wirelessly communicate sensor data. The memory also includes instructions executable by the processor to wirelessly transmit sensor data using the sensor access category.

In another particular embodiment, an apparatus includes means for determining, using access category data, distributed channel access parameters to be used for transmission of first data based on an access category assigned to a data type of the first data. The access category data specifies one or more access categories including a sensor access category specifying sensor data distributed channel access parameters to be used to wirelessly communicate sensor data. The apparatus also includes means for wirelessly transmitting the first data using the determined distributed channel access parameters.

In another particular embodiment, a method includes determining a data type of first data to be transmitted. The method also includes determining, using access category data, distributed channel access parameters to be used for transmission of the first data based on an access category assigned to the data type of the first data. The access category data specifies one or more access categories including a sensor access category specifying sensor data distributed channel access parameters to be used to wirelessly communicate sensor data. The method further includes wirelessly transmitting the first data using the determined distributed channel access parameters.

In another particular embodiment, a non-transitory storage medium includes processor-executable instructions that, when executed by a processor, cause the processor to determine a data type of first data to be transmitted and determine, using access category data, distributed channel access parameters to be used for transmission of the first data based on an access category assigned to the data type of the first data. The access category data specifies one or more access categories including a sensor access category specifying sensor data distributed channel access parameters to be used to wirelessly communicate sensor data.

One advantage provided by at least one of the embodiments described herein includes distributed access parameters that account for sensor traffic (e.g., data traffic associated with a low duty cycle) while maintaining medium access diversification among multiple access categories (e.g., multiple traffic types). Another particular advantage provided by at least one of the embodiments described herein includes distributed channel access parameters that allow medium access diversification among multiple access categories (ACs). A further particular advantage provided by at least one of the embodiments described herein includes distributed channel access parameters that conserve power of energy-constrained devices (e.g., devices that operate using a battery power source such as devices transmitting sensor traffic).

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIGS. 2A-2F illustrate particular embodiments of data structures used to access control data associated with the system of FIG. 1;

FIG. 10 is a diagram of a particular illustrative embodiment of an enhanced distributed channel access (EDCA) parameter set information element (IE).

VI. DETAILED DESCRIPTION

Figure 1:
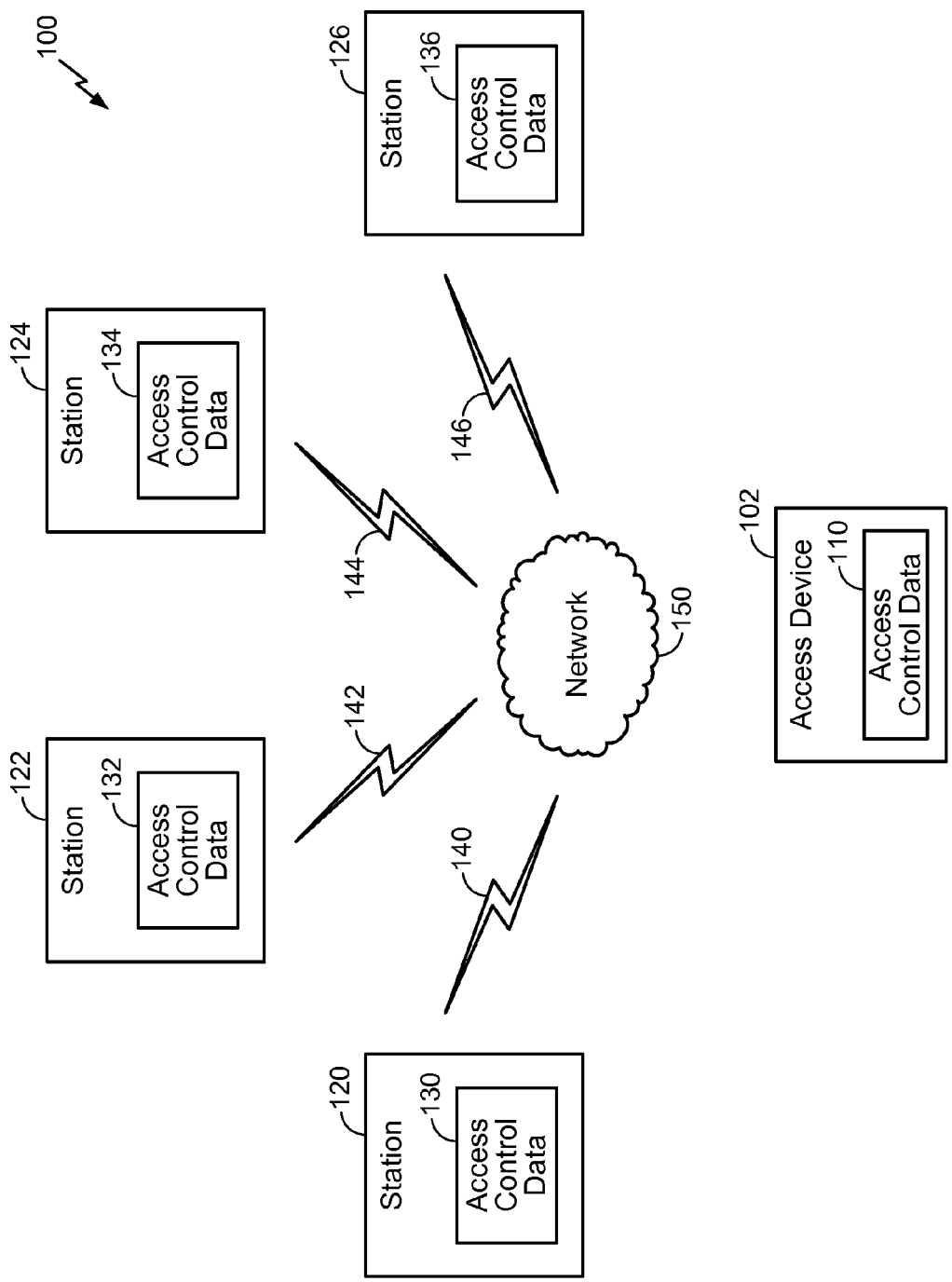
FIG. 1 is a diagram of a particular embodiment of a system that is operable to communicate using distributed channel access parameters.

Referring to FIG. 1, a diagram of a particular embodiment of a system that is operable to communicate in accordance with distributed channel access parameters is disclosed and generally designated 100. The system 100 may include an access device 102 and one or more station (STA) devices 120-126 that communicate 140-146 with the access device 102 via a network 150.

The access device 102 may include access control data 110 including distributed channel access parameters. The access control data 110 may define one or more access categories by specifying distributed channel access parameters for each of the one or more access categories. The access device 102 may be coupled to at least one of the station devices 120-126 via the network 150. In a particular embodiment, the access device 102 may be a wireless access point (AP).

The access device 102 may be an access point, a wireless gateway, a wireless router, a customer premise equipment (CPE) device, or another device operable to facilitate communication with the at least one of the station devices 120-126. The access device 102 may include one or more processors and one or more memories as described herein with respect to FIG. 6. For example, the access device 102 may include a memory storing the access control data 110 and instructions executable by the processor(s) to perform various access device 102 functions including transmitting at least a portion of the access control data 110 to at least one of the station devices 120-126, as described herein.

Each of the station (STA) devices 120-126 may include corresponding access control data 130-136. The access control data 130-136 may specify one or more access categories that each specify distributed channel access parameters. The access control data 130-136 of each of the station devices 120-126 may be the same access control data or different access control data. The access control data 110 of the access device 102 and the access control data 130-136 of a particular station device 120-126 may be the same access control data or different access control data.

The network 150 may be a wireless network (e.g., an Institute of Electrical and Electronics Engineers (IEEE) 802.11ah compliant wireless network) established by the access device 102. In a particular embodiment, the network 150 may be supported by the access device 102.

The station devices 120-126 may each be operable to communicate wirelessly with the access device 102. For example, the station devices 120-126 may be a laptop computer (e.g., with a IEEE 802.11 wireless card), a set-top box (e.g., a wireless set-top box), a personal computer, a tablet computer, a personal digital assistant (PDA), a CPE device, a multimedia device, a game console, a sensor, or a mobile phone.

During operation, the access device 102 may establish communication with the one or more station devices 120-126 using a connection routine (e.g., an IEEE 802.11ah compliant connection routine). Once connected to the access device 102, the station devices 120-126 may each transmit data to the access device 102 via the network 150 based at least in part on the access control data 130-136 stored at each device 120-126. The data may include sensor data, background data, best efforts data, and media data including audio data (e.g., voice data) and video data. A type of the data may be predetermined based on a type of the station or may be determined by an application executing on the station.

For example, the station device 120 may include the access control data 130 defining one or more access categories. The one or more access categories of the access control data 130 may include a sensor access category specifying distributed channel access parameters to be used by the station devices 120 to wirelessly communicate 140 sensor data via the network 150. The one or more access categories may further include at least one media access category that specifies distributed channel access parameters to be used by the station device 120 to wirelessly communicate 140 media data via the network 150.

In one embodiment, different devices may use different access control data based on device, device type (e.g., sensor, non-sensor, battery operated, mains operated, etc.), membership in a particular group, type of traffic, or other criteria. In a particular embodiment, a default value for the access control data associated with each device type or group (or based on other criteria) may be defined in an industry standard (e.g., IEEE 802.11ah) and may be known by all devices that are compliant with the industry standard. For example, a device to transmit data may be identified. In a particular embodiment, the device may be identified based on a device identifier (e.g., an international mobile subscriber identity, an international mobile equipment identity, a subscriber identity module identifier, a media access control address, an electronic serial number, or a combination thereof), a network address associated with the device, a local identifier associated with the device, a network identifier associated with the device, or a combination thereof. Thus, when the default value is to be used, access control data may not need to be communicated by an AP to STAs.

In one embodiment, the station device 120 may indicate to the access device 102 the device type (e.g., sensor device) and/or preferred access control data during association/re-association (e.g., as data in an association/re-association request message). The access device 102 may successively indicate to each station device 120-126, a group of station devices 120-126, or one or more types of station devices 120-126, the access control data by including the access control data in one or more enhanced distributed channel access (EDCA) parameter set Information Elements (IEs). The one or more EDCA parameter set IEs may be sent during association/re-association (e.g., as data in an association/re-association response message) or included in a beacon frame. In one embodiment the EDCA parameter set IE may be defined in an IEEE 802.11 standard. In another embodiment, the EDCA parameter set IE may be enhanced from that defined in an IEEE 802.11 standard by appending one or more access control data for each group of STAs or type of STAs. A particular embodiment of an EDCA parameter set IE is shown in FIG. 10.

In another embodiment, the access control data (or a portion of the access control data) for one or more groups of STAs or types of STAs may be included as a new field in the beacon frame instead of being included in an EDCA parameter set IE.

In one embodiment, the 1 octet reserved field of the EDCA parameter set IE used in the IEEE 802.11 standard may be used to identify the type of STA or group of STAs that are going to access the medium based on the access parameters specified by this access control data. In another embodiment, a new Information Element may be defined to store the one or more access control data for one or more of each of the STAs or type of STAs or group of STAs. One or more of these EDCA parameter set IEs may be included in the beacon or may be sent during association/re-association (e.g., in an association/re-association response message). Hence, different STAs, groups of STAs, or type of STAs may have different distributed channel access parameters for each access category.

In one embodiment, each STA, group of STAs, or type of STAs, may use the access control data parameters within a given interval of time. In one embodiment, the interval of time during which the access control data set for each STA, group of STAs, or type of STAs, is to be used may be indicated in the beacon, during association, or may be pre-defined as a multiple of beacons or may be limited to an interval of time when uplink access is granted.

In another embodiment, certain types of STAs may have the same access parameters for some or all of the access categories. As an example, a STA of type sensor may have the access parameters from AC_VO, AC_VI, AC_BE, and AC_BK set to the same values.

In another particular embodiment, all traffic for all user priorities (UPs) may be sent with the same transmission parameters. Moreover, traffic from different UPs may be sent in the same physical layer protocol data unit (PPDU). Further, traffic from different UPs may use a common sequence number space. It should be noted that this may differ from existing specifications, where each traffic identifier (TID)/UP uses a different sequence number space. The use of a common sequence number space for different TID/UP may be used by a particular type of STA, upon agreement with the receiver. The agreement may be indicated though the association procedure in an association request/response or later through a dedicated management exchange, such as a modification of the add block acknowledgement (ADDBA) procedure or traffic specifications (TSPEC) procedure. The use of the common sequence space across traffic of multiple TID/UPs may be indicated in each packet (e.g., each packet of multiple packets that is transmitted). One bit in a packet header may indicate that the medium access control (MAC) service data units (MSDUs) of the packet have a sequence number from the same space, irrespective of the TID/UP of each for the MSDUs. This enables use of a single normal Block acknowledgement (ACK) to acknowledge MSDUs from multiple TIDs/UPs.

In another particular embodiment, the station device 120 may include access control data 130 having a particular access category specifying distributed channel access parameters to be used by the station device 120 to wirelessly communicate 140 best efforts data and/or background data. For example, the one or more access categories may include a single access category for transmission of best efforts data and background data. In a particular embodiment, the station device 120 may wirelessly communicate 140 the best efforts data or the background data.

In a particular embodiment, the access category data may indicate that the sensor access category has a higher priority than other access categories. For example, the access category data may specify the sensor access category, a media access category, a voice access category, a video access category, a background access category, or a combination thereof. The sensor access category may have a higher priority that the media access category, the video access category, the voice access category, the background access category, or a combination thereof. To illustrate, an arbitration intra-frame spacing number (AIFSN) value associated with the sensor access category may be lower than an AIFSN value associated with one or more of the other access categories.

In a particular embodiment, the channel access parameters are indicated to each STA individually or to a group of STAs such that the indication is expressed as a delta relative to a set of base values that are announced in the beacon. Using the delta announced in the beacon may enable the AP to modify the parameters for all STAs or for a group of STAs by changing the base parameters in the beacon. In a particular embodiment, using the delta announced in the beacon may enable the AP to modify the parameters for all STAs or for a group of STAs at once (e.g., concurrently) by changing the base parameters in the beacon. For example, a base value of CWmin may be equal to 15 and a STA specific delta may be equal to 2, indicating that the CWmin at the STA is ((15+1)*2−1)=31. Similarly, a base TXOP limit may be equal to 1 millisecond (ms) and a STA specific delta may be equal to 2, indicating that the TXOP limit at the STA is equal to (1 ms*2)=2 ms. The use of a base value and STA specific or group specific delta values may decrease overhead associated with channel access parameters. For example, instead of communicating changed parameter values to each of multiple STAs or groups of STAs, an AP may change the base value once and broadcast the change in a beacon.

The system 100 of FIG. 1 may thus enable stations transmitting sensor data to have higher priority, enabling the sensor data to be favored for access to a transmission medium.

Since sensors may be power constrained (e.g., low power, battery operated devices, the sensors may be able to save (e.g., conserve) power by transmitting data without expending additional energy waiting for access to the transmission medium.

FIGS. 2A-2F are illustrations of particular embodiments of data structures 200, 220, 240, 260, 280, and 290 that may be used to maintain access control data, such as the access control data 110 of the access device 102 and/or the access control data 130-136 of a particular station device 120-126 of FIG. 1. Each data structure of the data structures 200, 220, 240, 260, 280, and 290 may include at least a portion of another data structure 200, 220, 240, 260, 280, and 290 and/or corresponding values from one of the other data structures 200, 220, 240, 260, 280, and 290. Each of the data structures 200, 220, 240, 260, 280, and 290 may be utilized by the access device 102 or the station devices 120-126 to allow medium access diversification among multiple access categories (ACs).

The data structure 200 of FIG. 2A illustrates a particular embodiment of representing access control data. The data structure 200 may include a plurality of fields, such as an access category field 202, a contention window minimum (CWmin) field 204, a contention window maximum (CWmax) field 206, and an arbitration intra-frame spacing number (AIFSN) field 208. In a particular embodiment, the values associated with the CWmin field 204 and the CWmax field 206 are time slot values.

As depicted in FIG. 2A, the access categories 202 may include a plurality of entries, such as one or more access categories 216-219. The one or more access categories 216-219 may include a best efforts category 216, a video category 217, a voice category 218, a sensor category 219, a background category (not shown), or any combination of categories thereof. In a particular embodiment, the best efforts category 216 may include the background category.

Each of the access categories 216-219 may include a corresponding minimum contention window value, a corresponding maximum contention window value, and a corresponding arbitration intra-frame spacing number (AIFSN) value. For example, the sensor access category 219 may indicate a minimum contention window value of seven (7), a maximum contention window value of thirty-one (31), and an AIFSN value of two (2). Further, the access category data of data structure 200 may specify the voice access category 218 having a minimum contention window value of fifteen (15), a maximum contention window value of thirty-one (31), and an AIFSN value of four (4). The access category data of data structure 200 may also specify the video access category 217 having a minimum contention window value of fifteen (15), a maximum contention window value of thirty-one (31), and an AIFSN value of five (5). Additionally, the access category data of data structure 200 may specify the best efforts access category 216 having a minimum contention window value of thirty-one (31), a maximum contention window value of one thousand twenty-three (1023), and an AIFSN value of seven (7).

The data structure 220 of FIG. 2B illustrates another particular embodiment of representing access control data. The data structure 220 may include a plurality of fields such as an access category field 222, a contention window minimum (CWmin) field 224, a contention window maximum (CWmax) field 226, an arbitration intra-frame spacing number (AIFSN) field 228, a transmission opportunity (TXOP) field 230, or any combination of fields thereof. The TXOP field 230 may include one or more options such as a first TXOP option 232 and a second TXOP option 234. The first TXOP option 232 and the second TXOP option 234 are associated with two distinct and selectable options in which a device, such as the access device 102 or the station devices 120-126 of FIG. 1 may operate.

As depicted in FIG. 2B, the access categories field 222 may include a plurality of entries such as one or more access categories 236-239. For example, the access categories 236-239 may include a best efforts category 236, a video category 237, a voice category 238, and a sensor category 239.

Each of the access categories 236-239 may include a corresponding minimum contention window value, a corresponding maximum contention window value, and a corresponding arbitration intra-frame spacing number (AIFSN) value. For example, the sensor access category 239 may indicate a minimum contention window value of seven (7), a maximum contention window value of fifteen (15), and an AIFSN value of two (2). Further, the access category data of data structure 200 may specify the voice access category 218 having a minimum contention window value of seven (7), a maximum contention window value of thirty-one (31), and an AIFSN value of four (4). The access category data of data structure 200 may also specify the video access category 217 having a minimum contention window value of fifteen (15), a maximum contention window value of thirty-one (31), and an AIFSN value of five (5). Additionally, the access category data of data structure 200 may specify the best efforts access category 216 having a minimum contention window value of thirty-one (31), a maximum contention window value of one thousand twenty-three (1023), and an AIFSN value of seven (7).

Each of the access categories 236-239 may also include at least one corresponding TXOP value such as a first TXOP value corresponding to the first TXOP option 232 or a second TXOP value corresponding to the second TXOP option 234. When a device is operating in a first TXOP option associated with the first TXOP option 232, each of the access categories operates in accordance with the first TXOP values of the first TXOP option 232. For example, when operating in the first TXOP option, the sensor access category 239 indicates a first TXOP value is approximately (e.g., ±20%) fifteen and six tenths (15.6) milliseconds. Further, when operating in the first TXOP option, the voice access category 238 indicates a first TXOP value is approximately (e.g., ±20%) fifteen and four hundredths (15.04) milliseconds, the video access category 237 indicates a first TXOP value is approximately (e.g., ±20%) twenty (20) milliseconds, and the best efforts access category 236 indicates a first TXOP value is zero (0).

When the device is operating in a second TXOP option associated with the second TXOP option 234, each of the access categories operates in accordance with the second TXOP values of the second TXOP option 234. For example, when operating in the second TXOP option, the sensor access category 239 indicates a first TXOP value is zero (0). Further, when operating in the second TXOP option, the voice access category 238 indicates a second TXOP value is approximately (e.g., ±20%) one and four hundred four thousandths (1.504) milliseconds, the video access category 237 indicates a second TXOP value is approximately (e.g., ±20%) three and eight hundredths (3.08) milliseconds, and the best efforts access category 236 indicates a second TXOP value is zero (0).

FIGS. 2C and 2D show alternative embodiments of data structures 240 and 260 that may indicate user priority (UP) to access category (AC) mapping. The data structure 240 of FIG. 2C illustrates a particular embodiment of representing access control data associated with user priority (UP) to access category (AC) mapping in which five (5) access categories are defined. Data structure 240 may include a plurality of fields such as a user priority (UP) field 244 and an access category (AC) field 246.

As depicted in FIG. 2C, the access categories field 246 may include a plurality of entries such as one or more access categories 250-258. The access categories 250-258 may include a background category 250, a best efforts category 252, a video category 254, a voice category 256, and a sensor category 258. The user priority (UP) field 244 may include a plurality of values that designate a priority associated with particular types of data. Each of the access categories may correspond to at least one user priority (UP) value. For example, the access categories 250-258 may correspond to the user priority (UP) values as depicted in FIG. 2C.

The data structure 260 of FIG. 2D illustrates another particular embodiment of representing access control data associated with user priority (UP) to access category (AC) mapping in which four (4) access categories are defined. Data structure 260 may include a plurality of fields, such as a user priority (UP) field 264 and an access category (AC) field 266.

As depicted in FIG. 2D, the access categories field 266 may include a plurality of entries, such as one or more access categories 268-274. The access categories 268-274 may include a best efforts category 268, a video category 270, a voice category 272, and a sensor category 274. In a particular embodiment, the best efforts category 268 may include a background category. For example, the one or more access categories 268-274 may include a single access category, such as the best efforts category 268, for use in transmission of best efforts data and background data.

The user priority (UP) field 264 may include a plurality of values that designate priorities of various data types. Each of the access categories may correspond to at least one user priority (UP) value. For example, the access categories 268-274 may correspond to the user priority (UP) values as depicted in FIG. 2D.

Figure 2E:
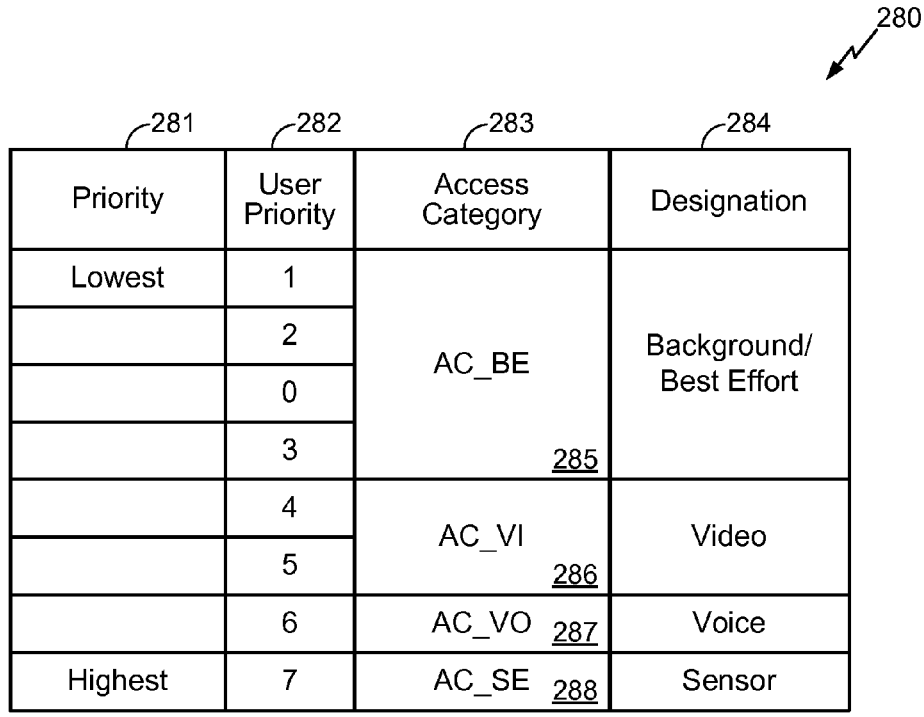

A data structure 280 of FIG. 2E illustrates another particular embodiment of representing access control data associated with user priority (UP) to access category (AC) mapping in which four (4) access categories are defined. The data structure 280 may include a plurality of fields, such as a priority ranking field 281, a user priority (UP) field 282, an access category (AC) field 283, and a designation field 284.

As depicted in FIG. 2E, the access category field 283 may include a plurality of entries, such as one or more access categories 285-288. The access categories 285-288 may include a best efforts category (AC_BE) 285, a video category (AC_VI) 286, a voice category (AC_VO) 287, and a sensor category (AC_SE) 288. In a particular embodiment, the best efforts category (AC_BE) 285 may include a background category. For example, the one or more access categories 285-288 may include a single access category, such as the best efforts category (AC_BE) 285, for use in transmission of best efforts data and background data.

The user priority (UP) field 282 may include a plurality of values that designate priorities of various data types. Each of the access categories 285-288 may correspond to at least one user priority (UP) value. For example, the best efforts access category (AC_BE) 285 may correspond to the user priority (UP) values one (1), two (2), zero (0), and three (3). The video category (AC_VI) 286 may correspond to the user priority (UP) values four (4) and five (5). The voice category (AC_VO) 287 may correspond to the user priority (UP) value of six (6) and the sensor category (AC_SE) 288 may correspond to the user priority (UP) value of seven (7).

Figure 2F:
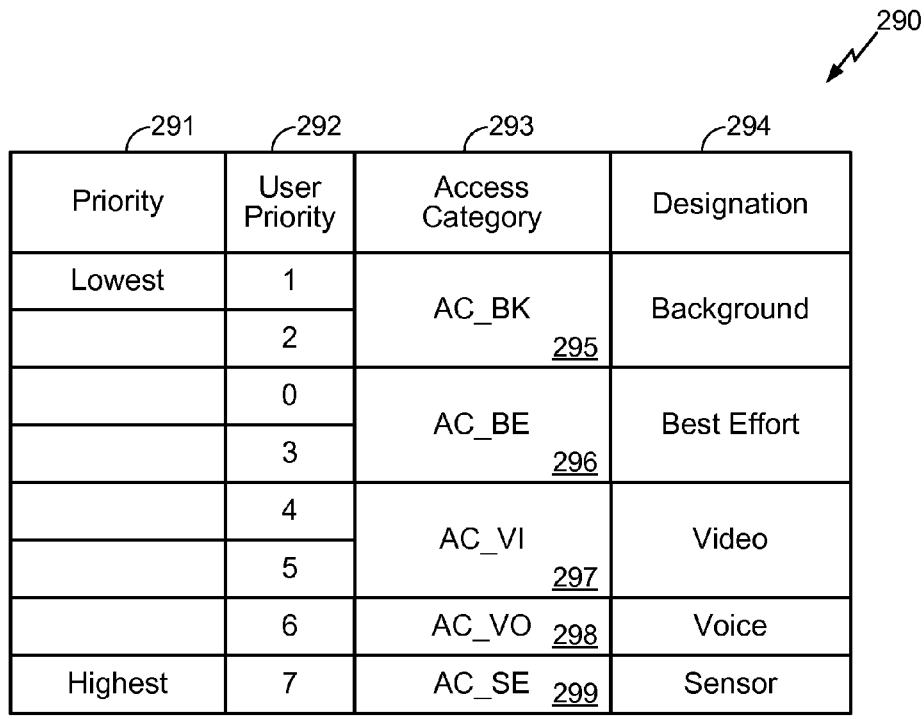

A data structure 290 of FIG. 2F illustrates another particular embodiment of representing access control data associated with user priority (UP) to access category (AC) mapping in which five (5) access categories, including separate categories for background data and best effort data, are defined. The data structure 290 may include a plurality of fields, such as a priority ranking field 291, a user priority (UP) field 292, an access category (AC) field 293, and a designation field 294.

As depicted in FIG. 2F, the access category field 293 may include a plurality of entries, such as one or more access categories 295-299. The access categories 295-299 may include a background category (AC_BK) 295, a best efforts category (AC_BE) 296, a video category (AC_VI) 297, a voice category (AC_VO) 298, and a sensor category (AC_SE) 299. The best efforts category (AC_BE) 296 may be used for transmission of best efforts data and the background category (AC_BK) 295 may be used for transmission of background data.

The user priority (UP) field 292 may include a plurality of values that designate priorities of various data types. Each of the access categories 295-299 may correspond to at least one user priority (UP) value. For example, the background access category (AC_BK) 295 may correspond to the user priority (UP) values one (1) and two (2). The best efforts access category (AC_BE) 296 may correspond to the user priority (UP) values zero (0) and three (3). The video category (AC_VI) 297 may correspond to the user priority (UP) values four (4) and five (5). The voice category (AC_VO) 298 may correspond to the user priority (UP) value of six (6) and the sensor category (AC_SE) 299 may correspond to the user priority (UP) value of seven (7).

Each data structure 240, 260, 280, and 290 may be used in conjunction with either the data structure 200 of FIG. 2A, the data structure 220 of FIG. 2B, or a combination thereof. Further, the access category 246 of FIG. 2C, the access category 266 of FIG. 2D, the access category field 283 of FIG. 2E, and the access category field 293 of FIG. 2F may correspond to the access category 202 of FIG. 2A and/or the access category 222 of FIG. 2B. One or more of the data structures 200, 220, 240, 260, 280, and 290 may be stored in a memory of the access device 102 and/or a memory of the station devices 120-126.

FIGS. 3A, 3B, 4, 5A, and 5B depict various statistical data representative of a plurality of simulations performed to determine distributed channel access parameters according to various embodiments disclosed herein. A simulation setup for each of the plurality of simulations included defining physical layer (PHY)/medium access control (MAC) parameters and various traffic patterns. In particular, FIGS. 3A, 3B, 4, 5A, and 5B were generated using data gathered over 100 trials in which each trial had a duration of one (1) minute.

The defined PHY/MAC parameters included a bandwidth of two (2) Megahertz (MHZ) and a PHY rate equal to six hundred (600) kilobytes per second (kbps), a PHY preamble (six (6) symbols) duration of two hundred forty (240) microseconds (μs), a short inter-frame space (SIFS) duration of one hundred six (106) microseconds (μs), and a SLOT duration of forty (40) microseconds (μs). The defined PHY/MAC parameters further included a compressed MAC header of twelve (12) bytes, an acknowledgment ACK of fourteen (14) bytes, a transmission power of approximately (e.g., ±20%) thirty-six and seven tenths (36.7) milliwatts (mW), and a reception power of approximately (e.g., ±20%) eleven and four tenths (11.4) milliwatts (mW).

The defined traffic patterns included voice traffic being full buffered at two hundred fifty-six (256) Bytes packets, video traffic being full buffered at one thousand (1000) Bytes packets, and sensor traffic being a duty cycle (one (1) packet per second (pkt/s)) at one hundred sixty (160) Bytes packets.

Figure 3B:
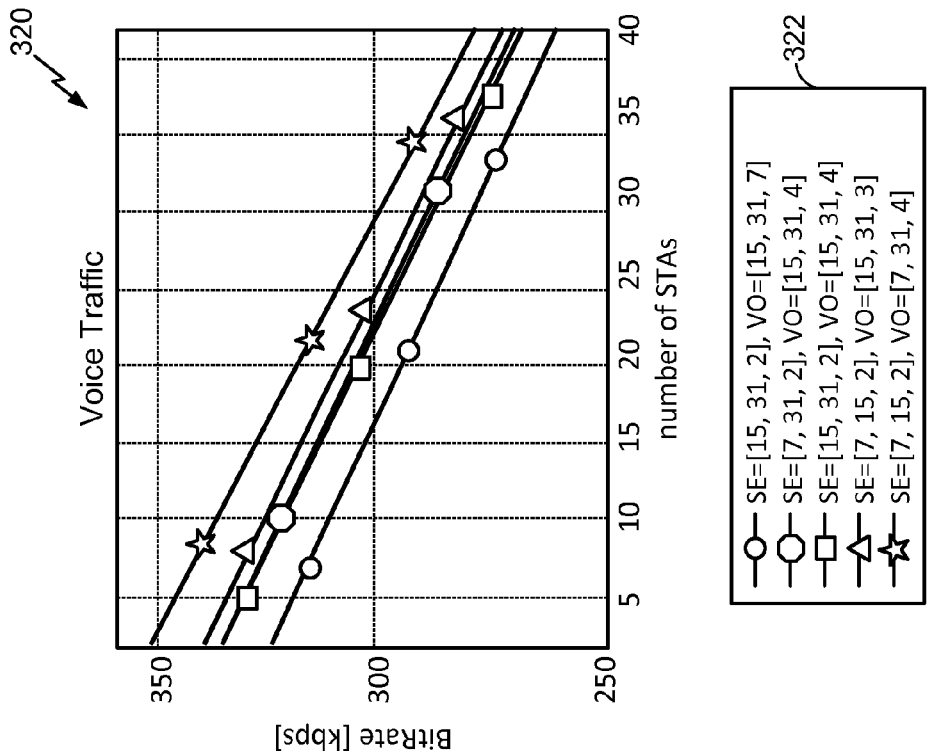
FIGS. 3A and 3B are graphs illustrating results of simulations of data transmissions in accordance with various distributed channel access parameters.
Figure 3A:
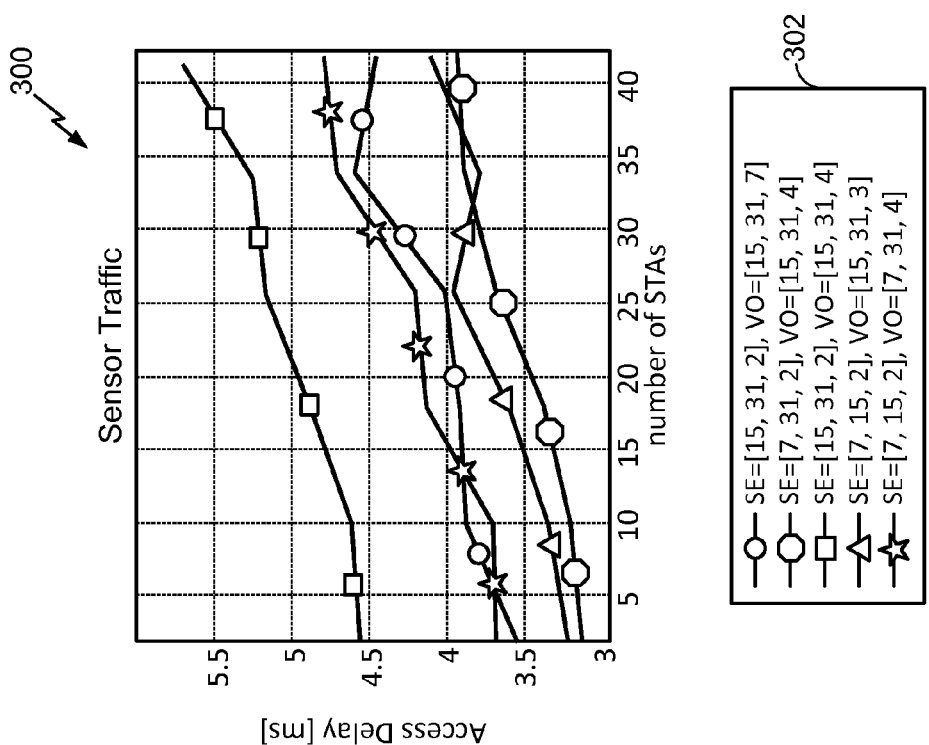
Figure 4:
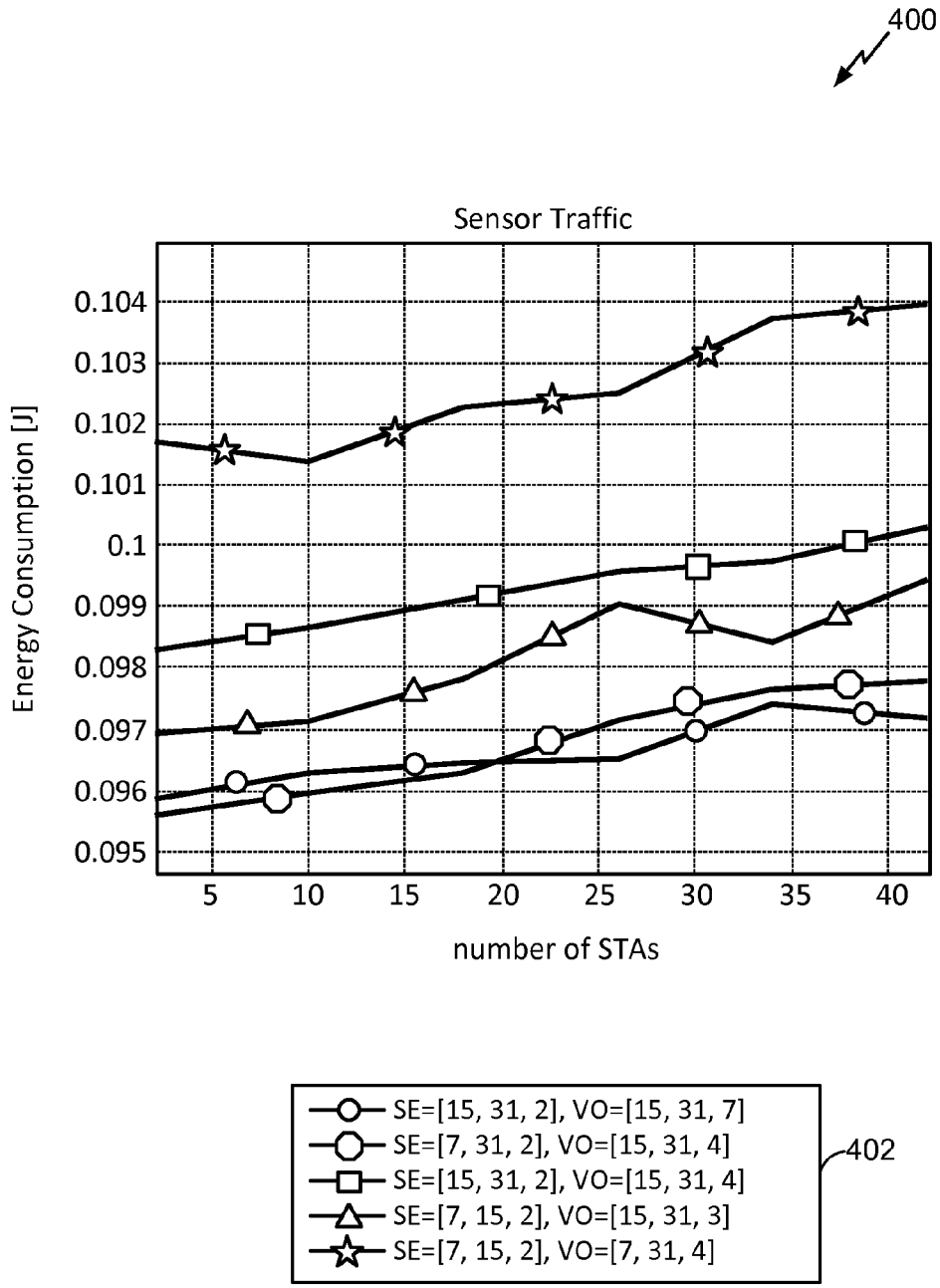
FIG. 4 is a graph illustrating particular results of simulations of data transmissions in accordance with various distributed channel access parameters.

In a first scenario, graphs 300, 320, and 400 of FIGS. 3A, 3B, and 4 were generated to determine a coexistence of the voice traffic and the sensor traffic. The first scenario included voice traffic being full buffered, where a first station device generated packets of one hundred sixty (160) bytes, which is equivalent to transmission (TX) duration of approximately (e.g., ±20%) two and six tenths (2.6) milliseconds (ms). The first scenario also included sensor traffic where all sensors transmitted with a duty cycle of one (1) packet per second, where all station devices generated packets of two hundred fifty-six bytes, which is equivalent to transmission (TX) duration of approximately (e.g., ±20%) three and eight tenths (3.8) milliseconds (ms), every second with random start times. Lines plotted on each of the graphs 300, 320, and 400 of FIGS. 3A, 3B, and 4 represent simulations performed where distributed channel access parameters were defined for a sensor access category (SE) associated with the sensor traffic (e.g., sensor data) and for a voice access category (VO) associated with the voice traffic (e.g., voice data). The defined values of the distributed channel access parameters for the sensory access category (SE) and the voice access category (VO) for each of the plotted lines are indicated in the legends 302, 322, and 402 of graphs 300, 320, and 400 of FIGS. 3A, 3B, and 4, where the distributed access parameter for a particular category are listed between corresponding brackets "[ ]" and represent ["a contention window minimum (CWmin) value", "a contention window maximum (CWmax) value", "an arbitration intra-frame spacing number (AIFSN) value"].

FIG. 3A is a graphical illustration of sensor traffic based on a relationship between a plurality of station devices (depicted along the horizontal axis) and an access delay in milliseconds (ms) (depicted along the vertical axis) and is generally designated 300. The access delay was determined as a difference between a transmission time of a packet and a packet-in-queue availability. As shown in graph 300, a combination of sensor access category (SE) values of [7, 31, 2] and voice access category (VO) values of [15, 31, 4] provided a lowest access delay for sensors.

FIG. 3B is a graphical illustration of voice traffic based on a relationship between a plurality of station devices (depicted along the horizontal axis) and a bit rate in kilobits per second (kbps) (depicted along the vertical axis) and is generally designated 320. As shown in graph 320, a combination of sensor access category (SE) values of [7, 15, 2] and voice access category (VO) values of [7, 31, 4] provided a highest bitrate for voice.

FIG. 4 is a graphical illustration of sensor traffic based on a relationship between a plurality of sensor devices (depicted along the horizontal axis) and an energy consumption for sensor devices in joules (J) (depicted along the vertical axis) and is generally designated 400. The energy consumption was associated with a total amount of energy spent (e.g., consumed) in both transmission and reception of packets. As shown in graph 400, two combinations of sensor access category (SE) values and voice access category (VO) values provided low energy consumption. A first combination that provided the low energy consumption was sensor access category (SE) values of [7, 31, 2] and voice access category (VO) values of [15, 31, 4]. A second combination that provided the low energy consumption was sensor access category (SE) values of [15, 31, 2] and voice access category (VO) values of [15, 31, 7].

As a result of the first scenario, it was determined that the combination of sensor access category (SE) values of [7, 31, 2] and voice access category (VO) values of [15, 31, 4] was preferred because sensor traffic should have a higher priority and be energy constrained.

Figure 5B:
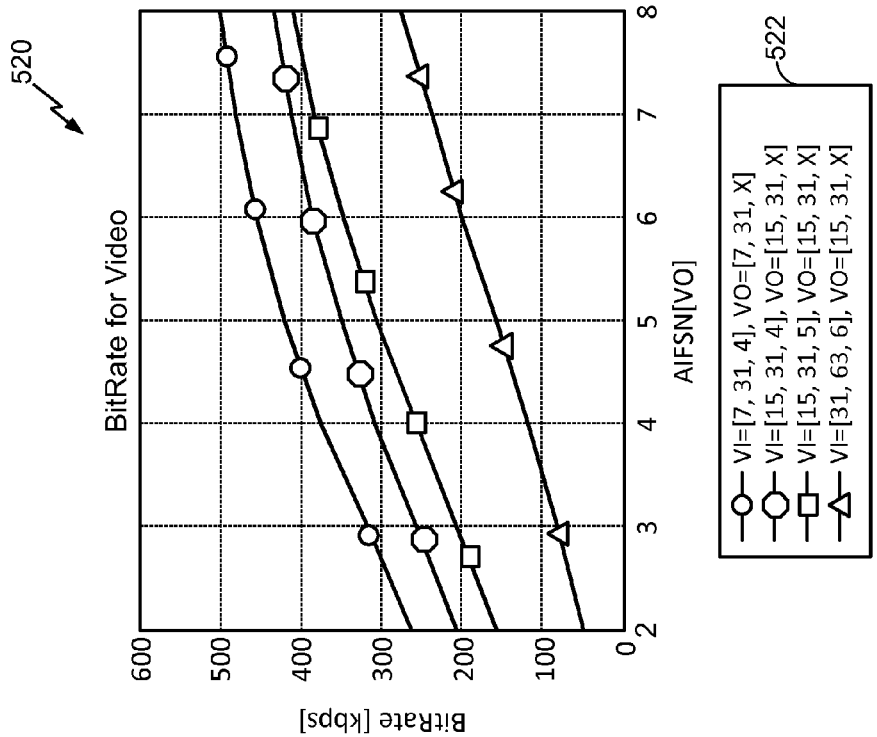
FIGS. 5A and 5B are graphs illustrating results of simulations data transmissions in accordance with various distributed channel access parameters.
Figure 5A:
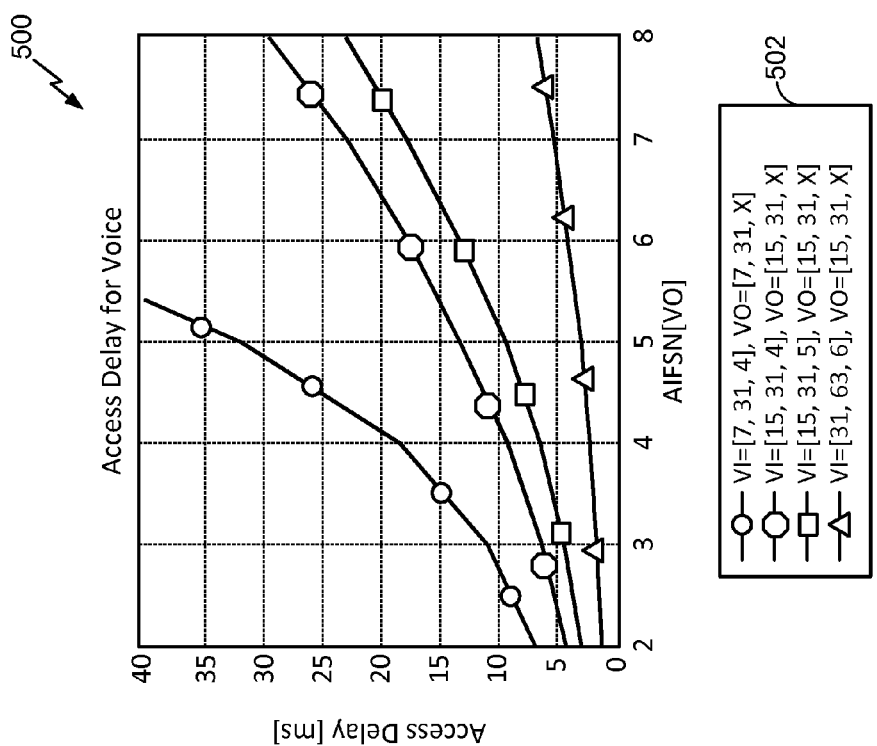

In a second scenario, graphs 500 and 520 of FIGS. 5A and 5B were generated to determine a coexistence of the voice traffic (where low access delay is desired) and the video traffic (where high bitrate is desired). The second scenario included voice traffic being full buffered and packets of one hundred sixty (160) bytes, which is equivalent to transmission (TX) duration of approximately (e.g., ±20%) two and six tenths (2.6) milliseconds (ms). The second scenario also included video traffic being full buffered and packets of fifteen hundred (1500) bytes, which is equivalent to transmission (TX) duration of approximately (e.g., ±20%) twenty (20) milliseconds (ms). Lines plotted on each of the graphs 500 and 520 of FIGS. 5A and 5B represent simulations performed where distributed channel access parameters were defined for a voice access category (VO) associated with the voice traffic (e.g., voice data) and for a video access category (VI) associated with the voice traffic (e.g., video data). The defined values of the distributed channel access parameters for the voice access category (VO) and the video access category (VI) for each of the plotted lines are indicated in the legends 502 and 522 of graphs 500 and 520 of FIGS. 5A and 5B, where the distributed access parameter for a particular category are listed between corresponding brackets "[ ]" and represent ["a contention window minimum (CWmin) value", "a contention window maximum (CWmax) value", "an arbitration intra-frame spacing number (AIFSN) value"]. To determine a coexistence of the voice traffic and the video traffic, the AIFSN value of the video access category (VI) was varied to generate the graphs 500 and 520 of FIGS. 5A and 5B.

FIG. 5A is a graphical illustration of access delay for voice traffic based on a relationship between AIFSN values for the voice traffic (depicted along the horizontal axis) and an access delay in milliseconds (ms) (depicted along the vertical axis) and is generally designated 500. The access delay was associated with a difference between a transmission time of a packet and a packet-in-queue availability. As shown in graph 500, a combination of sensor access category (SE) values of [7, 31, 2] and voice access category (VO) values of [15, 31, 4] provided a lowest access delay for sensors.

FIG. 5B is a graphical illustration of bitrates for video traffic based on a relationship between AIFSN values for the voice traffic (depicted along the horizontal axis) and a bit rate in kilobits per second (kbps) (depicted along the vertical axis) and is generally designated 520.

Voice traffic performed best when video traffic had a lower access priority. Thus, the second scenario indicates that video access category (VI) values of [15, 31, 5] allowed for a sufficient bitrate for transmission of video data. Further, based on the first scenario and the second scenario, a combination of distributed channel access parameters were determined including sensor access category (SE) values of [7, 31, 2], voice access category (VO) values of [15, 31, 4], video access category (VI) values of [15, 31, 5].

Figure 6:
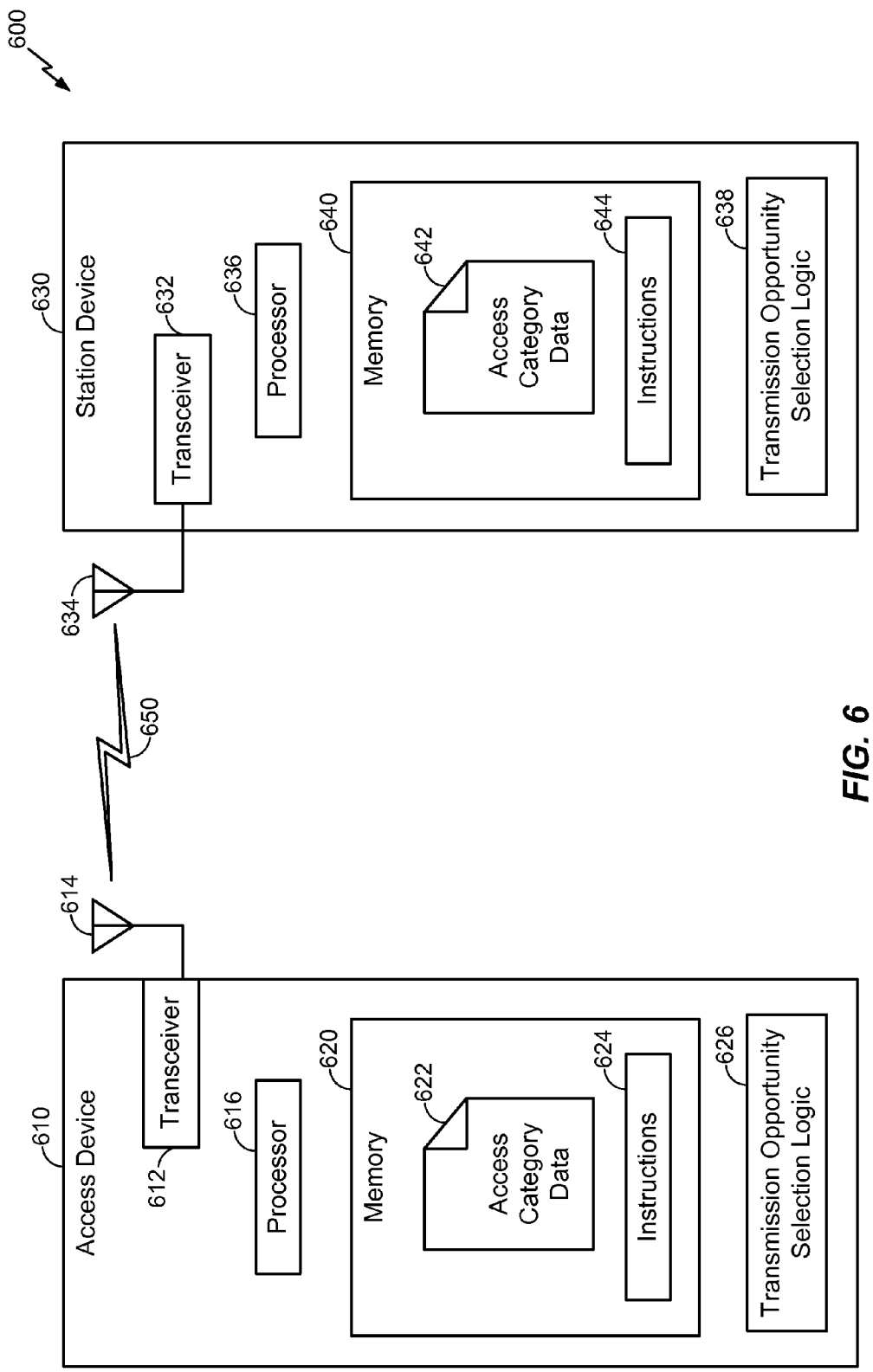
FIG. 6 is a diagram of a particular embodiment of a system that is operable to communicate using distributed channel access parameters.

FIG. 6 is a diagram to illustrate a particular embodiment of a system 600 to communicate using distributed channel access parameters. The system 600 may include an access device 610 communicatively coupled to one or more station devices (e.g., including an illustrative station device 630) via a network (not shown). For example the network may be the network 150 of FIG. 1. In a particular embodiment, the network may be established and/or supported by the access device 610.

The access device 610 may include access category data 622 and the station device 630 may include access category data 642. In an illustrative embodiment, the access device 610 having the access category data 622 may be the access device 102 and the access control data 110 of FIG. 1. In addition, the station device 630 having the access category data 642 may be one of the station devices 120-126 having corresponding access control data 130-136 of FIG. 1. For example, the station device 630 may be the station device 120 of FIG. 1.

The access device 610 may include a transceiver 612, an antenna 614, a processor 616, a memory 620 accessible to the processor 616, and transmission opportunity selection logic 626. The memory 620 may include the access category data 622 specifying one or more access categories including a sensor access category specifying distributed channel access parameters for use by one or more station devices during wireless communication of sensor data via a network. The memory 620 may further include instructions 624 executable by the processor 616 to send at least a portion of the access category data 622 to the station device 630 to enable the station device 630 to communicate sensor data. The memory 620 may further include instruction 624 executable by the processor 616 to establish the network with the one or more station devices such as the station device 630. The transceiver 612 may be operable to transmit and receive data, such as the access category data 622, via the antenna 614. For example, the access category data 622 may be the access control data 110 and 130-136 of FIG. 1, or the data structures 200, 220, 240, 260, 280, and 290 of FIGS. 2A-F.

In a particular embodiment, the one or more access categories of the access category data 622 may include at least one media access category that specifies distributed channel access parameters to be used by the station device 630 to wirelessly communicate media data via the network. The access category data 622 may specify a lower priority for the media data than for the sensor data. For example, the sensor access category may indicate a first arbitration intra-frame spacing number (AIFSN) value and the access category data 622 may include a second AIFSN value for the at least one media access category, where the first AIFSN value is lower than the second AIFSN value.

In another particular embodiment, the one or more access categories of the access category data 622 may include at least one voice access category that specifies distributed channel access parameters to be used by the station device 630 when wirelessly communicating voice data via the network. For example, the access category data 622 may specify a lower priority for the voice data than for the sensor data.

In a further particular embodiment, the one or more access categories of the access category data 622 may include at least one video access category that specifies distributed channel access parameters to be used by the station device 630 to wirelessly communicate video data via the network. For example, the access category data 622 may specify a lower priority for the video data than for the sensor data.

The transmission opportunity selection logic 626 may be operable to select a particular transmission opportunity option associated with the access category data 622. For example, the transmission opportunity selection logic 626 may be operable to select between the first TXOP option 232 and the second TXOP option 234 of data structure 220 of FIG. 2B.

During operation of the access device 610, the processor 616 may execute application(s) based on the instructions 624 stored in the memory 620. The processor 616 may also be operable to execute instructions associated with transmission opportunity selection logic 626.

The station device 630 may include a transceiver 632, a processor 636, a memory 640 accessible by the processor 636, and transmission opportunity selection logic 638. The transceiver 632 may be coupled to an antenna 634. The transceiver 632 may be operable to transmit and receive data included in wireless communication 650 via the antenna 634. The station device 630 may include an IEEE 802.11ah sensor or other devices having a low duty cycle and may transmit data to the access device 610, such as another IEEE 802.11ah device or another non-IEEE 802.11ah device.

The memory 640 may include the access category data 642 specifying one or more access categories including a sensor access category specifying sensor data distributed channel access parameters to be used during wireless communication of sensor data. The memory 640 may also include instructions 644 executable by the processor 636 to wirelessly transmit the sensor data based on access parameters associated with the sensor access category.

In a particular embodiment, the one or more access categories may include at least one media access category that specifies distributed channel access parameters to be used to wirelessly communicate media data. For example, the sensor access category may indicate a first arbitration intra-frame spacing number (AIFSN) and the access category data 642 may include a second AIFSN for at least one media access category, where the first AIFSN is lower than the second AIFSN.

In another particular embodiment, the one or more access categories may further include at least one voice access category that specifies distributed channel access parameters to be used to wirelessly communicate voice data. The one or more access categories may further include at least one video access category that specifies distributed channel access parameters to be used to wirelessly communicate video data.

In a particular embodiment, the sensor data distributed channel access parameters may include a minimum contention window value of seven (7), a maximum contention window value of thirty-one (31), and an AIFSN value of two (2). The one or more access categories may further include a voice access category, a video access category, and a best efforts/background access category. The voice access category may specifying voice data distributed channel access parameters including a minimum contention window value of fifteen (15), a maximum contention window value of thirty-one (31), and an AIFSN value of four (4). The video access category specifying video data distributed channel access parameters including a minimum contention window value of fifteen (15), a maximum contention window value of thirty-one (31), and an AIFSN value of five (5). The best efforts/background access category specifying best efforts/background data distributed channel access parameters including a minimum contention window of thirty-one (31), a maximum contention window of one thousand twenty-three (1023), and an AIFSN value of seven (7).

In yet another particular embodiment, the sensor data distributed channel access parameters may include a minimum contention window value of seven (7), a maximum contention window of fifteen (15), and an AIFSN value of two (2). The one or more access categories may further include a video access category specifying video data distributed channel access parameters including a minimum contention window value of fifteen (7), a maximum contention window value of thirty-one (31), and an AIFSN value of four (4).

The transmission opportunity selection logic 638 may be operable to select a particular transmission opportunity option associated with the access category data 642. For example, the transmission opportunity selection logic 638 may be operable to select between the first TXOP option 232 and the second TXOP option 234 of data structure 220 of FIG. 2B.

During operation of the access device 610, the processor 616 may execute one or more applications based on the instructions 624 stored in the memory 620. The processor 616 may also be operable to execute instructions associated with the transmission opportunity selection logic 626.

The access device 610 may receive a request (e.g., issue an association request) from the station device 630 requesting to establish a wireless connection. The access device 610 may receive the request via the antenna 614 and the transceiver 612 of the access device 610. In response to receiving the request, the access device 610 and the station device 630 may engage in a connection routine (e.g., an IEEE 802.11ah compliant connection routine). After successful completion of the connection routine, the wireless connection may be established between the access device 610 and the station device 630.

Prior to, during, or subsequent to the connection routine, the access device 610 may determine whether the station device 630 includes access category data 642. The access device 610 may request information associated with the access category data 642 from the station device 630 or the station device may provide the information as part of the request to establish the wireless connection. In response to determining that the station device 630 includes the access category data 642, the access device may further determine whether the access category data 642 of the station device 630 needs to be update. For example, the access category data 642 may be the access control data 110 and 130-136 of FIG. 1 or the data structures 200, 220, 240, 260, 280, and 290 of FIGS. 2A-F.

In response to a determination that the station device 630 does not include the access category data 642 or in response to a determination that the access category data 642 needs to be updated, the access device 610 may send at least a portion of the access category data 622 of the access device 610 to the station device 630. The station device 630 may receive the portion of the access category data 622 and store the access category data 622 in the memory 640 of the station device 630 as the access category data 642.

In an alternative embodiment, the access device 610 may automatically transmit the access category data 622 of the access device 610 to the station device 630 for storage in the memory 640 of the station device 630. When the wireless connection is established and the station device 630 includes the access category data 642, the access device 610 and the station device 630 may communicate data via the wireless connection.

To send data (e.g., a data packet) from the station device 630 to the access device 610, the station device 630 may determine, using the access category data 642, distributed channel access parameters to be applied for a transmission of the data. Prior to the transmission of the data, the station device 630 may determine a data type associated with the data to be transmitted. For example, the station device 630 may determine the data type based at least in part on an application layer associated with the data packet. The station device 630 may then determine the distributed channel parameters to be used for the transmission of the data based on the determined data type. In a particular embodiment, the transmission opportunity selection logic 638 of the station device 630 may select one of a plurality of transmission opportunity (TXOP) options to be used when transmitting the data.

The station device 630 may wirelessly transmit the data to the access device 610 using the determined distributed channel access parameters. The station device 630 may transmit the data via the transceiver 632 and the antenna 634 of the station device 630.

In a particular embodiment, the station device 630 may include a sensor and/or an application to generate sensor data. In addition to the sensor data, the station device 630 may also generate another type of data other than sensor data, such as media data (e.g., voice data, video data, or a combination thereof), best efforts data, background data, or a combination thereof). The access category data 642 of the station device 630 may include the access control data 110 and 130-136 of FIG. 1, the data structures 200, 220, 240, 260, 280, and 290 of FIGS. 2A-F, or a combination thereof. Data traffic (e.g., the sensor data and data other than the sensor data) of the station device 630 may be prioritized based on an access category data type of such data traffic. For example, sensor traffic (e.g., the sensor data) may be associated with a sensor access category (e.g., SE or AC_SE) and may be transmitted at a higher priority than other types of traffic (e.g., data other than the sensor data). For example, the sensor access category (SE) may be assigned a highest priority (e.g., a low arbitration inter-frame space number (AIFSN) value).

Prior to the transmission of the data, the station device 630 may determine an access category associated with the data to be transmitted. For example, the access category may be determined based on a data type associated with the data to be transmitted. In a particular embodiment, the data type is sensor data and the access category is a sensor category (e.g., a sensor category (AC_SE) as in the data structures 200, 220, 240, 260, 280, and 290 of FIGS. 2A-F). The station device 630 may use one or more of the data structures 200, 220, 240, 260, 280, and 290 of FIGS. 2A-F to determine one or more parameters for use during transmission of the data.

In a first illustrative embodiment, the station device 630 may transmit data using distributed channel access parameters associated with the data to be transmitted. The station device 630 may determine an access category associated with the data to be transmitted. For example, the station device 630 may determine the access category of the data based on a data type associated with the data to be transmitted. In a particular embodiment, the data type of the data is a sensor data type. The station device 630 may access the access category data 642 of the station device 630 to determine the distributed channel access parameters based on the access category associated with the data. For example, the access category data 642 may include one or more of the data structures 200, 220 of FIGS. 2A-B, and the station device 630 may identify the distributed channel access parameters using one or more of the data structures 200, 200 of FIGS. 2A-B. The distribution access parameters may include an arbitration intra-frame spacing number (AIFSN) value, a CWmin value, a CWmax value, or a combination thereof. The station device 630 may transmit the data based at least in part on the identified distributed channel access parameters associated with the data.

In a second illustrative embodiment, the station device 630 may transmit data using a transmission opportunity (TXOP) value associated with the data to be transmitted. For example, the station device 630 may determine the TXOP value based on an access category associated with the data to be transmitted. The transmission opportunity selection logic 638 of the station device 630 may select one of a plurality of transmission opportunity (TXOP) options to be used when transmitting the data. The station device 630 may access the access category data 642 of the station device 630 to identify the TXOP value for the selected TXOP option based on the access category associated with the data. For example, the access category data 642 may include the data structure 220 of FIG. 2B, and the station device 630 may identify the TXOP value of the data structure 220 of FIG. 2B. The station device

630 may transmit the data based at least in part on the identified TXOP value associated with data.

In a third illustrative embodiment, the station device 630 may transmit data using a user priority (UP) value associated with the data to be transmitted. For example, the station may determine the UP value based on an access category associated with the data to be transmitted. The station device 630 may access the access category data 642 of the station device 630 to identify the UP value based on the access category associated with the data. For example, the access category data 642 may be maintained in one or more of the data structures 240, 260, 280 of FIGS. 2C-F, and the station device 630 may identify the UP value based on one or more of the data structures 240, 260, 280 of FIGS. 2C-F. The station device 630 may transmit the data based at least in part on the identified UP value associated with data. For example, when the station device 630 needs to transmit first data corresponding to sensor data and second data corresponding to voice data, the station may determine a first UP value associated with the sensor data and second UP value associated with the voice data. The station device 630 may prioritize sending the first data (e.g., the sensor data) and the second data (e.g., the voice data) based on the first UP value and the second UP value. In a particular embodiment, the first UP value of the sensor data has a higher numerical value than the second UP value of the voice data, where the higher numerical value indicates that the sensor data has a higher priority than the voice data.

Figure 7:
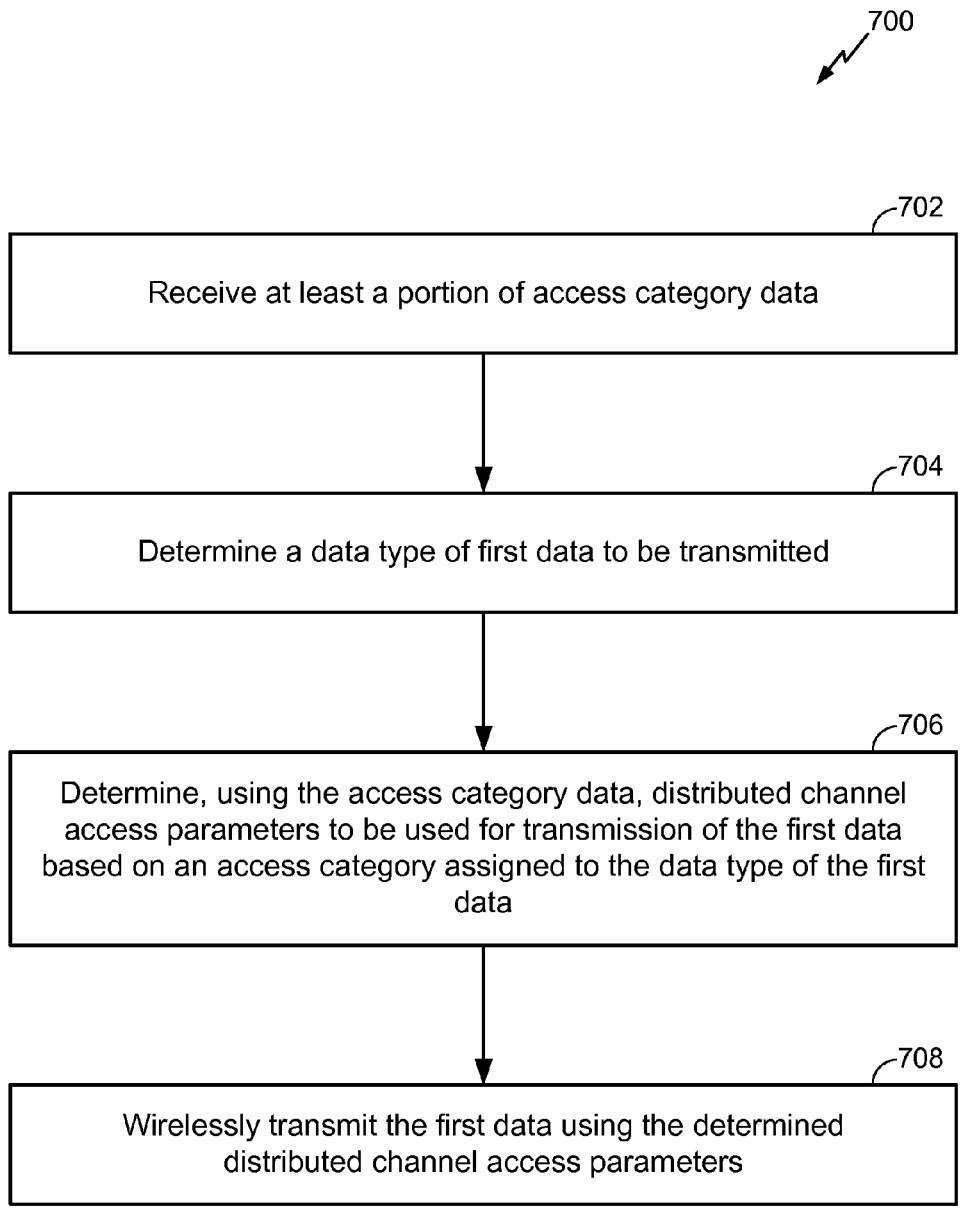
FIG. 7 is a flow chart of a particular embodiment of a method of performing communication using distributed channel access parameters.

Referring to FIG. 7, a flowchart of a particular embodiment of a method of communicating using distributed channel access parameters is disclosed and generally designated 700. The method 700 may be performed by a device configured to wirelessly transmit data. For example, the device may be the access device 102 or the station devices 120-126 of FIG. 1 or the access device 610 and the station device 630 of FIG. 6.

The method 700 may include receiving at least a portion of access category data, at 702. For example, at least a portion of access category data may be received from an access device (e.g., an access point) before determining distributed channel access parameters to be used for transmission of first data. The access category data (or a portion thereof) may include one or more access categories. The one or more access categories may include at least one media access category that specifies distributed channel access parameters to be used to wirelessly communicate media data. For example, the access category data may be the access control data 110 and 130-136 of FIG. 1, the data structures 200, 220, 240, 260, 280, and 290 of FIGS. 2A-F, or the access category data 622 and 642 of FIG. 6. In a particular embodiment the station device may receive the access category data from the access device. In another example the access category data may be received at a time of construction of the station device.

The method 700 may include determining a data type of first data to be transmitted, at 704. The method 700 may also include determining, using the access category data, distributed channel access parameters to be used for transmission of the first data based on an access category assigned to the data type of the first data, at 706. The access category data specifies one or more access categories including a sensor access category specifying sensor data distributed channel access parameters to be used to wirelessly communicate sensor data. The method 700 may include wirelessly transmitting the first data using the determined distributed channel access parameters, at 708.

The method 700 of FIG. 7 may thus enable a device to wirelessly transmit data (e.g., sensor data) using (e.g., in accordance with) distributed channel access parameters having a sensor access category associated with sensor traffic having a low duty cycle. The sensor access category associated with sensor traffic may have a highest priority (e.g., a lowest AIFSN value) as compared to a plurality of other access categories. By assigning the sensor access category a lower AIFSN value than the other access categories, energy consumption may be limited for a device that transmits sensor data (e.g., sensor traffic).

Figure 8:
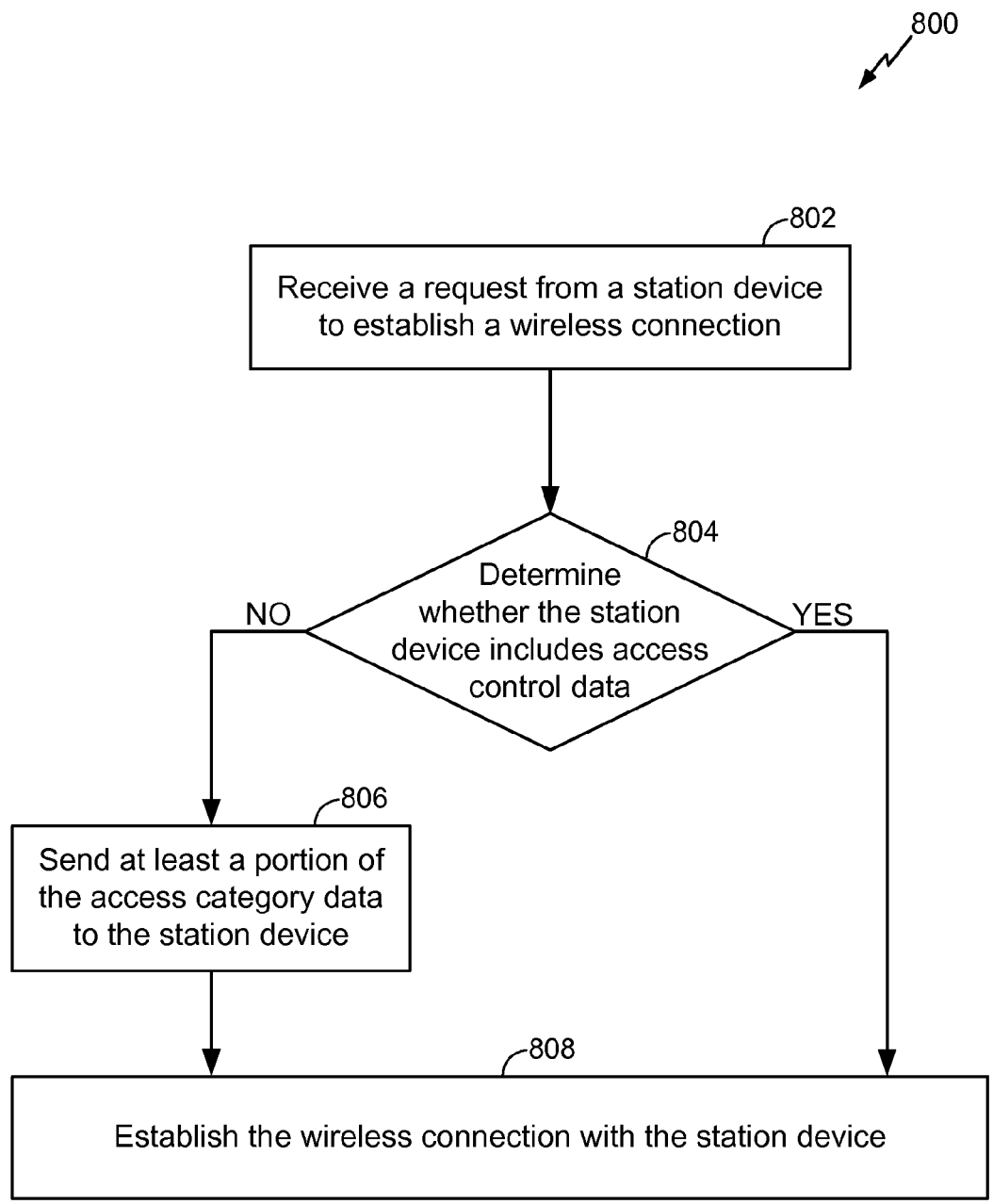
FIG. 8 is a flow chart of a particular embodiment of a method of transferring distributed access parameters.

Referring to FIG. 8, a flowchart of a particular embodiment of a method of transferring distributed channel access parameters is disclosed and generally designated 800. The method 800 may be performed by a device configured to wirelessly transmit data. For example, the device may be the access device 102 of FIG. 1, the station devices 120-126 of FIG. 1, the access device 610 of FIG. 6, or the station device 630 of FIG. 6.

The method 800 may include receiving a request from a station device to establish a wireless connection, at 802. For example, the station device may be one of the station devices 120-126 of FIG. 1 or the station device 630 of FIG. 6

The method 800 may include determining whether the station device includes access control data, at 804. For example, the access category data may be one of the access control data 110 and 130-136 of FIG. 1, the data structures 200, 220, 240, 260, 280, and 290 of FIGS. 2A-F, or the access category data 622 and 642 of FIG. 6. In response to a determination that the station device does not include the access control data, the method 800 may advance to 806. In response to a determination that the station device includes the access control data, the method 800 may advance to 808.

Moving to 806, the method 800 may include sending at least a portion of the access category data to the station device. The method may then proceed to 808.

In response to a determination that the station device includes the access control data, the method 800 may advance to 808. At 808, the method 800 may include establishing the wireless connection with the station device. For example, the wireless connection may be established using an IEEE 802.11ah compliant connection routine.

The method 800 of FIG. 8 may thus enable a device (e.g., an access device) to transmit at least a portion of access control data (e.g., distributed access parameters) to a station device. The portion of the access control data provided to the station device may be based on a type of traffic (e.g., a type of data) that the station device is configured to communicate (e.g., transmit). The access control data may specify a sensor access category associated with sensor traffic having a low duty cycle. The sensor access category may be associated with may have a highest priority (e.g., a lowest AIFSN value) for a plurality of access categories. By assigning the sensor access category a lower AIFSN value than the other access categories, energy consumption may be limited for the device.

Figure 9:
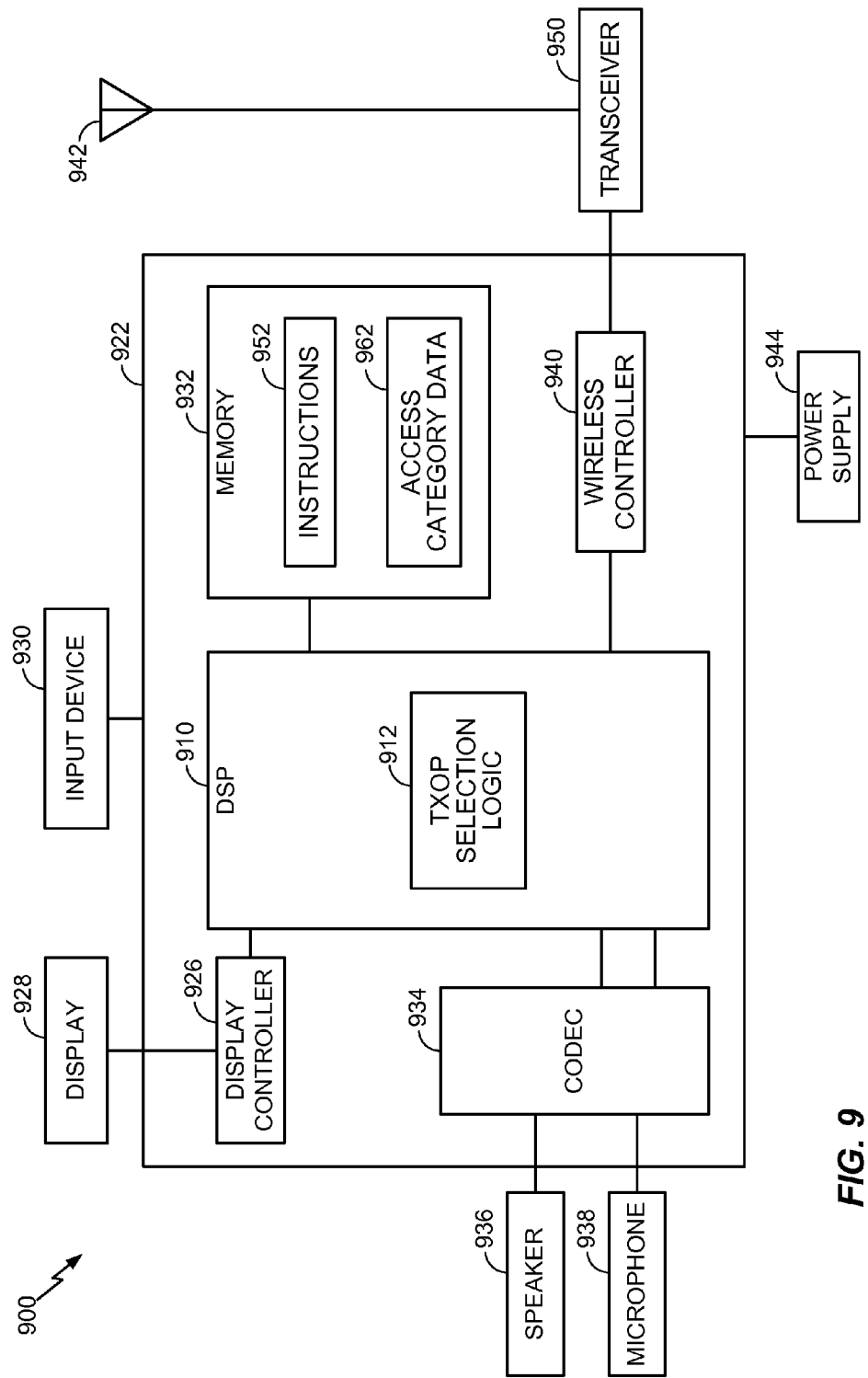
FIG. 9 is a block diagram of a particular embodiment of a wireless device operable to perform rate control and power control.

Referring to FIG. 9, a block diagram of a particular embodiment of a wireless device including a processor operable to communicate using distributed channel access in accordance with the described embodiments is disclosed and generally designated 900. The device 900 includes a processor, such as a processor 910, coupled to a memory 932. The processor 910 may include transmission opportunity (TXOP) selection logic 912. For example, the TXOP selection logic 912 may include the transmission opportunity selection logic 626 and 638 of FIG. 6.

The memory 932 may be a non-transitory computer readable storage medium that stores data (e.g., access category data 962), instructions, or both. For example, the access category data 962 may be one of the access control data 110 and 130-136 of FIG. 1, the data structures 200, 220, 240, 260, 280, and 290 of FIGS. 2A-F, or the access category data 622 and 642 of FIG. 6. In a particular embodiment, the memory 932 may include instructions 952 that may be executable by the processor 910 to cause the processor 910 to perform one or more functions of the device 900. For example, the instructions 952 may include user applications, an operating system, or other executable instructions, or a combination thereof. The instructions 952 may be executable by the processor 910 to cause the processor 910 to perform at least a portion of the functionality described with respect to any of FIGS. 1 and 6-8. For example, the instructions 952 may include instructions that are executable by a computer (e.g., the processor 910) to cause the computer to perform the method 700 of FIG. 7, the method 800 of FIG. 8, or a combination thereof.

In a particular embodiment, the memory 932 includes a non-transitory computer readable medium including instructions that, when executed by the processor 910, cause the processor 910 to determine a data type of first data to be transmitted and to determine, using access category data, distributed channel access parameters to be used for transmission of the first data based on an access category assigned to the data type of the first data. The access category data may specify one or more access categories including a sensor access category specifying sensor data distributed channel access parameters to be used to wirelessly communicate sensor data. In a particular embodiment, the instructions may further cause the processor to initiate a wireless transmission of the first data using the determined distributed channel access parameters. For example, the distributed channel access parameters may include an arbitration intra-frame spacing number (AIFSN) value, a CWmin value, a CWmax value, a transmission opportunity (TXOP) value, a user priority (UP) value, or a combination thereof, and the processor may initiate a transmission of the first data in accordance with one or more of the distributed channel access parameters.

In another particular embodiment, the memory 932 includes a non-transitory computer readable medium including instructions that, when executed by the processor 910, cause the processor to send at least a portion of the access category data to a station device to enable the station device to communicate sensor data. The access category data may specify one or more access categories including a sensor access category specifying sensor data distributed channel access parameters to be used to wirelessly communicate sensor data.

The device 900 may include a transceiver 950 for sending and receiving signals and/or data packets. For example, the device 900 may function as a transmitter when the device 900 transmits signals and/or packets and may function as a receiver when the device 900 receives signals and/or packets.

FIG. 9 also shows a display controller 926 that may be coupled to the processor 910 and to a display 928. A coder/decoder (CODEC) 934 (e.g., an audio and/or voice CODEC) may be coupled to the processor 910. A speaker 936 and a microphone 938 may be coupled to the CODEC 934. FIG. 9 also indicates that a wireless controller 940 may be coupled to the processor 910 and to the transceiver 950 that is coupled to a wireless antenna 942. In a particular embodiment, the processor 910, the display controller 926, the memory 932, the CODEC 934, the wireless controller 940, and the transceiver 950 are included in a system-in-package or system-on-chip device 922.

In a particular embodiment, an input device 930 and a power supply 944 are coupled to the system-on-chip device 922. Moreover, in a particular embodiment, as illustrated in FIG. 9, the display 928, the input device 930, the speaker 936, the microphone 938, the wireless antenna 942, and the power supply 944 are external to the system-on-chip device 922. However, each of the display 928, the input device 930, the speaker 936, the microphone 938, the wireless antenna 942, and the power supply 944 can be coupled to a component of the system-on-chip device 922, such as an interface or a controller.

It should be noted that although FIG. 9 depicts a wireless communications device, the processor 910 and the memory 932 may be integrated into other devices, such as a multimedia player, an entertainment unit, a navigation device, a personal digital assistant (PDA), a fixed location data unit, or a computer (e.g., a tablet computer, a laptop computer, a desktop computer, etc.), a media device, a sensor, an access point, a router or gateway device, or another device configured to wirelessly communicate data.

In conjunction with the described embodiments, an apparatus is disclosed that includes means for receiving at least a portion of access category data from an access point before determining distributed channel access parameters to be used for transmission of first data. For example, the means for receiving may include one or more of the transceivers 612 and 632 and the antennas 614 and 634 of FIG. 6, the wireless controller 940 and the antenna 942 of FIG. 9, or any combination thereof.

The apparatus includes means for determining a data type of the first data to be transmitted. For example, the means for determining a data type of first data may include one or more of the processors 616 and 636 of FIG. 6, the processor 910 of FIG. 9, or any combination thereof.

The apparatus includes means for determining, using access category data, distributed channel access parameters to be used for transmission of the first data based on an access category assigned to the data type of the first data. For example, the means for determining, using access category data, distributed channel access parameters may include one or more of the processors 616 and 636 of FIG. 6, the processor 910 of FIG. 9, or any combination thereof.

The apparatus also includes means for wirelessly transmitting the first data using the determined distributed channel access parameters. For example, the means for transmitting may include one or more the transceivers 612 and 632 and the antennas 614 and 634 of FIG. 6, the wireless controller 940 and the antenna 942 of FIG. 9, or any combination thereof.

In conjunction with the described embodiments, an apparatus is disclosed that includes means for receiving a request from a station device to establish a wireless connection. For example, the means for receiving may include one or more of the transceivers 612 and 632 and the antennas 614 and 634 of FIG. 6, the wireless controller 940 and the antenna 942 of FIG. 9, or any combination thereof.

The apparatus includes means for determining whether the station device includes access control data. For example, the means for determining whether the station device includes access control data may include one or more of the processors 616 and 636 of FIG. 6, the processor 910 of FIG. 9, or any combination thereof.

The apparatus includes means for sending at least a portion of the access category data to the station device. For example, the means for sending may include one or more of the transceivers 612 and 632 and the antennas 614 and 634 of FIG. 6, the wireless controller 940 and the antenna 942 of FIG. 9, or any combination thereof.

The apparatus also includes means for establishing the wireless connection with the station device. For example, the means for establishing may include one or more of the transceivers 612 and 632 and the antennas 614 and 634 of FIG. 6, the wireless controller 940 and the antenna 942 of FIG. 9, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A device comprising:
   a processor; and
   a memory accessible by the processor, the memory comprising:
   access category data specifying one or more access categories, the one or more access categories including a sensor access category specifying distributed channel access parameters to be used by one or more station devices to wirelessly communicate sensor data via a network; and
   instructions executable by the processor to:
   transmit at least a portion of the access category data to a station device of the one or more station devices to enable the station device to communicate sensor data, wherein the access category data is associated with an indication for determining a device type; and
   after transmitting at least the portion of the access category, receive first data from the station device based on the distributed channel access parameters.

2. The device of claim 1, wherein the memory further comprises instructions executable by the processor to establish communication, via the network, with the one or more station devices.

3. The device of claim 1, wherein the one or more access categories further include at least one media access category that specifies the distributed channel access parameters to be used by the one or more station devices to wirelessly communicate media data via the network.

4. The device of claim 1, wherein the sensor access category indicates a first arbitration intra-frame spacing number (AIFSN) value and the access category data includes a second AIFSN value for at least one media access category, wherein the first AIFSN value is lower less than the second AIFSN value.

5. The device of claim 1, wherein the sensor access category indicates a minimum contention window value of seven (7), a maximum contention window value of thirty-one (31), and an arbitration intra-frame spacing number (AIFSN) value of two (2).

6. The device of claim 1, wherein the sensor access category indicates a minimum contention window value of seven (7), a maximum contention window value of fifteen (15), and an arbitration intra-frame spacing number (AIFSN) value of two (2).

7. The device of claim 1, wherein the sensor access category indicates a transmit opportunity (TXOP) value, wherein the TXOP value is one of zero (0) or approximately fifteen and six tenths (15.6) milliseconds.

8. The device of claim 1, wherein the one or more access categories include a single access category for transmission of best efforts data and background data.

9. A device comprising:
   a processor; and
   a memory accessible by the processor, the memory comprising instructions executable by the processor to:
   receive at least a portion of access category data from an access point, wherein the access category data is associated with an indication for determining a device type;
   store the access category data in the memory, the access category data specifying one or more access categories, the one or more access categories including a sensor access category specifying distributed channel access parameters to be used to wirelessly communicate sensor data; and
   wirelessly transmit sensor data using the sensor access category.

10. The device of claim 9, wherein the one or more access categories further include at least one media access category that specifies the distributed channel access parameters to be used to wirelessly communicate media data.

11. The device of claim 10, wherein the access category data specifies a lower priority for the media data than for the sensor data.

12. The device of claim 9, wherein the one or more access categories further include at least one voice access category that specifies the distributed channel access parameters to be used to wirelessly communicate voice data.

13. The device of claim 12, wherein the access category data specifies a lower priority for the voice data than for the sensor data.

14. The device of claim 9, wherein the one or more access categories further include at least one video access category that specifies the distributed channel access parameters to be used to wirelessly communicate video data.

15. The device of claim 14, wherein the access category data specifies a lower priority for the video data than for the sensor data.

16. An apparatus comprising:
   means for receiving at least a portion of access category data from an access point, wherein the access category data is associated with an indication for determining a device type;
   means for determining, using the access category data, distributed channel access parameters to be used for transmission of first data based on an access category assigned to a data type of the first data, wherein the access category data specifies one or more access categories including a sensor access category specifying sensor data distributed channel access parameters to be used to wirelessly communicate sensor data; and
   means for wirelessly transmitting the first data using the determined distributed channel access parameters.

17. The apparatus of claim 16, further comprising means for determining a data type of the first data to be transmitted.

18. The apparatus of claim 16, wherein the sensor access category indicates a first arbitration intra-frame spacing number (AIFSN), and the access category data includes a second AIFSN for at least one media access category, wherein the first AIFSN is less than the second AIFSN.

19. The apparatus of claim 16, wherein the sensor access category indicates a minimum contention window value of seven (7), a maximum contention window value of thirty-one (31), and an arbitration intra-frame spacing number (AIFSN) value of two (2).

20. The apparatus of claim 19, wherein the access category data specifies a voice access category having a minimum contention window value of fifteen (15), a maximum contention window value of thirty-one (31), and an AIFSN value of four (4).

21. The apparatus of claim 19, wherein the access category data specifies a video access category having a minimum contention window value of fifteen (15), a maximum contention window value of thirty-one (31), and an AIFSN value of five (5).

22. The apparatus of claim 19, wherein the access category data specifies a best efforts access category having a minimum contention window value of thirty-one (31), a maximum contention window value of one thousand twenty-three (1023), and an AIFSN value of seven (7).

23. A method comprising:
   determining a data type of first data to be transmitted;
   receiving access category data from an access point, wherein the access category data is associated with an indication for determining a device type;
   determining, using the access category data, distributed channel access parameters to be used for transmission of the first data based on an access category assigned to the data type of the first data, wherein the access category data specifies one or more access categories including a sensor access category specifying sensor data distributed channel access parameters to be used to wirelessly communicate sensor data; and
   wirelessly transmitting the first data using the determined distributed channel access parameters.

24. The method of claim 23, further comprising receiving at least a portion of the access category data from an access point before determining the distributed channel access parameters to be used for transmission of the first data.

25. The method of claim 23, wherein the sensor data distributed channel access parameters include a minimum contention window value of seven (7), a maximum contention window value of fifteen (15), and an arbitration intra-frame spacing number (AIFSN) value of two (2).

26. The method of claim 25, wherein the one or more access categories includes a video access category specifying video data distributed channel access parameters including a minimum contention window value of fifteen (7), a maximum contention window value of thirty-one (31), and an AIFSN value of four (4).

27. The method of claim 23, wherein the sensor data distributed channel access parameters indicate a transmission opportunity (TXOP) value of zero (0).

28. The method of claim 23, wherein the sensor data distributed channel access parameters indicate a transmission opportunity (TXOP) value of approximately fifteen and six tenths (15.6) milliseconds.

29. The method of claim 23, wherein the one or more access categories include a single access category for transmission of best efforts data and background data.

30. The method of claim 23, wherein the data type comprises one of best efforts, video, voice, or sensor.

31. The method of claim 23, wherein the one or more access categories include the sensor access category, a best efforts access category, a video access category, a voice access category, or a combination thereof.

32. The method of claim 31, wherein the one or more access categories include a single access category for best efforts data and background data.

33. The method of claim 23, wherein at least one channel access parameter of the distributed channel access parameters comprises a minimum contention window value, a maximum contention window value, an arbitration intra-frame spacing number value, or a combination thereof.

34. The method of claim 23, wherein at least one channel access parameter of the distributed channel access parameters is associated with an enhanced distributed channel access (EDCA) parameter.

35. A non-transitory storage medium comprising processor-executable instructions that, when executed by a processor, cause the processor to:
   determine a data type of first data to be transmitted;
   receive access category data from an access point, wherein the access category data is associated with an indication for determining a device type; and
   determine, using the access category data, distributed channel access parameters to be used for transmission of the first data based on an access category assigned to the data type of the first data, wherein the access category data specifies one or more access categories including a sensor access category specifying sensor data distributed channel access parameters to be used to wirelessly communicate sensor data.

36. The non-transitory storage medium of claim 35, wherein at least one channel access parameter is determined based at least in part on a device type.

37. The non-transitory storage medium of claim 35, wherein at least one channel access parameter is determined based at least in part on device membership in a particular group.

38. The non-transitory storage medium of claim 35, wherein at least one channel access parameter is determined based at least in part on a traffic type.

39. The non-transitory storage medium of claim 35, further comprising processor-executable instructions that, when executed by the processor, cause the processor to determine at least one channel access parameter based on an Institute of Electrical and Electronics Engineers (IEEE) 802.11ah standard.

40. The non-transitory storage medium of claim 35, further comprising processor-executable instructions that, when executed by the processor, cause the processor to determine a first value of at least one distributed channel access parameter based on a base value and a delta value.

41. The non-transitory storage medium of claim 40, further comprising processor-executable instructions that, when executed by the processor, cause the processor to:
receive a second base value; and
determine a second value of the at least one distributed channel access parameter based on the second base value and the delta value.

42. The non-transitory storage medium of claim 40, further comprising receiving the base value in a beacon.

43. The non-transitory storage medium of claim 40, wherein the delta value comprises a device specific delta value or a group specific delta value.

44. The non-transitory storage medium of claim 40, further comprising processor-executable instructions that, when executed by the processor, cause the processor to initiate a wireless transmission of the first data using the determined distributed channel access parameters.

45. A method comprising:
determining a device type associated with a device to transmit data;
receiving access category data from an access point, wherein the access category data is associated with an indication for determining a device type; and
determining, using the access category data, at least one distributed channel access parameter to be used for a transmission of the data based on the device type, wherein the access category data specifies one or more access categories including a sensor access category, wherein the sensor access category specifies sensor data distributed channel access parameters to be used to wirelessly communicate sensor data.

46. The method of claim 45, wherein the at least one channel access parameter comprises one of a minimum contention window value, a maximum contention window value, an arbitration intra-frame spacing number value, or a combination thereof.

47. The method of claim 45, wherein the at least one channel access parameter is associated with an enhanced distributed channel access (EDCA) parameter.

48. The method of claim 45, wherein the at least one channel access parameter is associated with a transmission opportunity (TXOP) value.

49. The method of claim 45, wherein the device type is determined based on a membership of the device in a particular group.

50. The method of claim 45, wherein the device type is determined based on a traffic type of data generated by the device.

51. The method of claim 45, wherein the device type comprises a sensor, non-sensor, battery operated, mains operated, or a combination thereof.

52. The method of claim 45, wherein the one or more access categories comprise the sensor access category, a best efforts access category, a video access category, a voice access category, or a combination thereof.

53. The method of claim 52, wherein the one or more access categories comprise a single access category for best efforts data and background data.

54. The method of claim 45, further comprising determining the at least one channel access parameter based on an Institute of Electrical and Electronics Engineers (IEEE) 802.11ah standard.

55. A method comprising:
identifying a device to transmit data;
receive access category data from an access point, wherein the access category data is associated with an indication for determining a device type; and
determining, using the access category data, at least one distributed channel access parameter to be used for a transmission of the data based on the identified device, wherein the access category data specifies one or more access categories including a sensor access category, wherein the sensor access category specifies sensor data distributed channel access parameters to be used to wirelessly communicate sensor data.

56. The method of claim 55, wherein the device is identified based on a device identifier, a network address associated with the device, a local identifier associated with the device, a network identifier associated with the device, or a combination thereof.

57. The method of claim 56, wherein the device identifier comprises an international mobile subscriber identity, an international mobile equipment identity, a subscriber identity module identifier, a media access control address, an electronic serial number, or a combination thereof.

58. The method of claim 55, wherein the one or more access categories comprise the sensor access category, a best efforts access category, a video access category, a voice access category, or a combination thereof.

59. The method of claim 58, wherein the one or more access categories comprise a single access category for best efforts data and background data.

60. The method of claim 55, wherein the at least one channel access parameter comprises a minimum contention window value, a maximum contention window value, an arbitration intra-frame spacing number value, or a combination thereof.

61. The method of claim 55, wherein the at least one channel access parameter is associated with an enhanced distributed channel access (EDCA) parameter.

* * * * *